United States Patent Office 3,657,282
Patented Apr. 18, 1972

3,657,282
CARBOXYEPOXYETHYL-1-PHOSPHONIC
ACID AND DERIVATIVES
Burton G. Christensen, Scotch Plains, Thomas R. Beattie,
North Plainfield, and Donald W. Graham, Menlo Park,
N.J., assignors to Merck & Co., Inc., Rahway, N.J.
No Drawing. Filed Jan. 23, 1969, Ser. No. 793,590
Int. Cl. C07f 9/38
U.S. Cl. 260—348 A                          4 Claims

ABSTRACT OF THE DISCLOSURE

Novel substituted epoxyethylphosphonic acids and derivatives thereof are prepared by oxidation of the corresponding vinyl compounds or by treating a 1,2-disubstituted ethylphosphonic acid compound with a reagent capable of effecting epoxide ring closure. The new substituted epoxyethylphosphonic acid compounds and derivatives such as their salts are antibacterials which inhibit the growth of gram-positive and gram-negative bacteria.

BACKGROUND OF THE INVENTION

This invention is concerned with novel compounds having antibiotic activity and with processes for preparing these compounds. More particularly, it relates to new substituted epoxyethylphosphonic acid compounds which have antibacterial activity and with processes for their preparation.

Although various antibotics are now known, these products have limited activity and, in addition, have been found to be ineffective against resistant strains of pathogenic bacteria. Accordingly, the search has continued to find new antibiotics effective against broader spectra of microorganisms, and especially against resistant strains.

SUMMARY OF THE INVENTION

It is an object of this invention to provide new substituted epoxyethylphosphonates effective as antibiotics against various bacteria and resistant strains thereof. Another object is to provide processes and intermediates for the preparation of these valuable antibiotics. Other objects will be apparent from the detailed description of this invention hereinafter provided.

In accordance with this invention, it is now found that substituted epoxyethylphosphonic acids of the formula

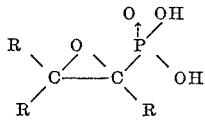

the corresponding phosphono thioic acids, and the salts, amides, esters and anhydrides of these acids wherein R represents hydrogen or an organic or inorganic group or radical such as hydrocarbyl other than alkyl, a substituted hydrocarbyl group, carboxy or a substituted carboxy group, a heterocyclic group, a substituted heterocyclic group, an amino or substituted amino group, sulfono or a substituted sulfonyl group, hydroxy or substituted hydroxy group, mercapto or a hydrocarbylthio group, or a formyl, halo, nitro, cyano, phosphono, arsono, or acyl radical, or the group

wherein $R_1$ represents hydrogen or methyl and $R_3$ is an organic or inorganic group or radical set forth above, and in which at least one R substituent is a group other than hydrogen, are valuable new compounds useful as antibacterials or as intermediates useful in preparing antibiotic active compounds. The substitutent R preferably represents groups or radicals containing 1 to 10 carbon atoms.

Illustrative of the various groups or radicals representing R in the foregoing formula that might be mentioned are hydrocarbyl groups such as aryl, for example phenyl and naphthyl, alkenyl, for example vinyl and isopropenyl, alkynyl, for example ethynyl and propynyl, cycloalkyl, for example cyclopentyl and cyclopropyl; heterocyclic radicals, for example oxiranyl, pyridyl, furyl, thienyl and imidazoyl, substituted hydrocarbyl or heterocyclic radicals containing one or more substituents such as halo, lower alkyl, carboxy, carboxamido, nitro, amino, lower alkylamino, diloweralkylamino, acylamino, sulfono, sulfamoyl, and the like; carboxy; substituted carboxy, for example carbamoyl, N-hydroxycarbamoyl, N - amino carbamoyl, dimethylcarbamoyl and carbalkoxy; amino; substituted amino such as hydrocarbylsulfonylamino, for example methylsulfonylamino (—NHSO$_2$CH$_3$), ureido (—NHCONH$_2$), carbohydrocarbyloxyamino such as carbethoxyamino (—NHCOOC$_2$H$_5$)

hydroxyamino, amidino, guanidino, hydrazino, hydrocarbylamino such as methylamino, benzylamino and phenylamino, dihydrocarbylamino such as dimethylamino, or acylamino such as acetylamino; sulfono and salts thereof, substituted sulfonyl such as sulfamoyl, N-hydrocarbylsulfamoyl such as N-methylsulfamoyl or N,N-dimethylsulfamoyl, acylsulfamoyl such as N-acetylsulfamoyl, halosulfonyl such as chlorosulfonyl, haloalkylsulfonyl such as trifluoromethylsulfonyl and chloromethylsulfonyl, N-hydrocarbylcarbonylsulfamoyl such as N-methylcarbonylsulfamoyl (—SO$_2$NHCOCH$_3$), N-hydrocarbylsulfonylsulfamoyl such as N-methylsulfonylsulfamoyl (—SO$_2$NHSO$_2$CH$_3$), N-carboxysulfamoyl, N-carbohydrocarbyloxysulfamoyl such as N-carbethoxysulfamoyl (—SO$_2$NHCOOC$_2$H$_5$), N-hydrocarbylsulfonylsulfamoyl such as N-ethylsulfonylsulfamoyl (—SO$_2$NHSO$_2$C$_2$H$_5$)

mercapto or a hydrocarbylthio such as ethylthio and methylthio; and acyl groups such an acetyl or propionyl.

The new substituted epoxyethylphosphonic acids of this invention can be prepared by several methods. In accordance with one embodiment of this invention, the new phosphonic acids are prepared by the epoxidation of a substituted vinyl compound of the formula

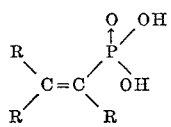

wherein R represents hydrogen or a group or radical defined above, or a salt, amide, ester, monoester salt or monoamide salt of the substituted vinylphosphonic acid. In the starting compounds being oxidized, at least one of the R substituents is a group or radical other than hydrogen. In carrying out this epoxidation, it is preferred to utilize a salt of the phosphonic acid or of a monoester or monoamide in order to obtain maximum yields, although a diester or amides can also be used. Various methods can be utilized in carrying out the desired epoxidation.

One of the better methods of epoxidizing the ethylenic double bond is by treating said compound with hydrogen peroxide. Although hydrogen peroxide alone may be used, it is preferred to conduct the reaction in the presence of a suitable inorganic peracid. The inorganic peracid is sometimes referred to as a catalyst, although the exact role of such peracid is not unequivocally established as a catalyst in the classical sense, and it may participate as an epoxidizing agent. Although the peracid itself may be added to the reaction medium, it is generally preferred that the inorganic acid be added to the reaction mixture and the peracid formed in situ by reaction with the hydrogen peroxide. Particularly useful catalysts are the peracids of tungsten, vanadium and molybdenum, either as the simple acids or polyacids, including the heteropolyacid forms. The inorganic acids are generally used in the form of neutral salts, such as an alkali metal, e.g. sodium or potassium tungstate, ammonium tungstate, alkaline earth metal salts such as calcium or barium tungstate or vanadate, heavy metal salt, examples of which are zinc vanadate, zinc tungstate, tin tungstate, tin molybdate, aluminum tungstate and aluminum molybdate.

In addition to the simple peracids, there may be used heteropolyacids, examples of which are the heteropolytungstic acids of arsenic, antimony and bismuth. In the same way heteropolymolybdic and heteropolychromic acids of sulfur, selenium or tellurium may also be utilized as catalyst. In general, the heteropolyacids of the acid-forming elements of Group VI of the Periodic Table of Elements are satisfactory. Other catalysts which are suitable, although not as effective as those mentioned above, are alkali metal carbonates, bicarbonates and phosphates, e.g. sodium carbonate, potassium carbonate, sodium phosphate and disodium hydrogen phosphate. At least about 0.1% of catalyst (by weight of phosphonic acid compound) is used for best results. Higher amounts are not harmful and up to about 30% by weight may be employed if desired. It is preferred to use from about 0.25–5% of inorganic peracid (by weight of vinylphosphonate). The reaction is conveniently brought about at temperatures of from between about 0° and 90° C., and preferably from between about room temperature and 80° C. and at a pH of between about 3.0 and 11.0, and preferably from about 4.0 to 6.0. At a pH below about 4.0, reaction temperatures elow about 15° C. are desirable in order to avoid or minimize decomposition of the desired epoxyethylphosphonic acid compound. At the higher pH levels (i.e. above 8.0), the hydrogen peroxide decomposes at an appreciable rate and must be replaced during the reaction.

Good results are obtained by dissolving or suspending the phosphonic acid compound in the solvent, adjusting to the desired pH, adding the catalyst and finally the hydrogen peroxide. The rate and temperature of the reaction may be readily controlled by rate of peroxide addition. For best results, at least one mole of peroxide per mole of phosphonic acid compound is utilized, and it is preferred to employ at least about 3 moles of peroxide per mole of phosphonate. Larger excesses are not deleterious.

Water and/or alcohols compatible with hydrogen peroxide are preferably employed as solvent media, suitable alcohols being lower alkanols such as methanol, ethanol, propanol or butanol. If desired, chelating agents such as ethylenediamine tetraacetic acid, ethylenediamine diacetic acid, glycine or β-alanine may be present during the epoxidation reaction in order to sequester any heavy metals such as iron, nickel or copper which tend to catalyze the decomposition of hydrogen peroxide.

Upon completion of the epoxidation reaction, any excess hydrogen peroxide is decomposed. The substituted epoxyethylphosphonic acid compound can be recovered by separation from inorganic compounds and subsequent crystallization or evaporation of the reaction mixture to dryness.

Alternatively, the substituted epoxyethylphosphonic acid compounds of this invention can also be obtained by reaction of the vinylphosphonate with an organic peracid such as peracetic, perbenzoic, substituted perbenzoic, monoperphthalic, performic peroxytrifluoroacetic acid, preferably at temperatures of between about −10° C. and 150° C. Peroxyanhydrides may also be employed as a source of the peroxy acids if so desired. This peroxidation is preferably carried out in inert hydrocarbon solvents such as chloroform, methylene dichloride, benzene, toluene, pyridine or ethyl acetate. The reaction time is not critical and it is, of course, preferable to continue the peroxidation until the maximum amount of epoxide has been produced. Generally, a molar excess of organic peracid is utilized for best results. It is preferred that the reaction mixture be buffered when employing those peracids which will decompose during the reaction to strong acids, e.g. peroxytrifluoroacetic acid. Disodium hydrogen phosphate is an example of a suitable buffering agent. The desired products may be recovered by methods known to those skilled in this art, for instance by decomposition of excess perorganic acid and removal of the solvent or solvents.

In addition, other methods known in the art for the preparation of epoxides can be employed to produce the new compounds of this invention. Such methods that might be mentioned include reaction of the substituted vinylphosphonic acid compounds with an organic hydroperoxide such as t-butylhydroperoxide, with hydrogen peroxide in the presence of a nitrile such as acetonitrile, propionitrile and benzonitrile, with oxygen in the presence of suitable catalysts such as alkali metal tungstates or vanadates, with an oxidizing metal salt such as chromium trioxide, or an alkali metal permanganate, with an alkali metal hypohalite such as sodium or potassium hypochlorite or hypobromite, with ozone in the presence of either a donor olefin or a compound that forms a 1:1 adduct with ozone which decomposes to release oxygen in a very active form; or with an alkyl perborate or alkyl perphosphate.

Alternatively, and pursuant to another embodiment of this invention, the novel substituted epoxyethylphosphonic acid compounds can also be prepared by treating a 1,2-disubstituted ethylphosphonic acid of the formula

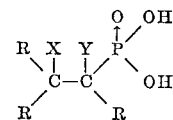

wherein R is the same as defined above, or a salt, ester, amide, monoester salt or monoamide salt under conditions suitable to effecting epoxide ring closure. Thus, in the foregoing formula at least one of substituents X or Y must be a hydroxy radical or other functionally equivalent oxy substituent which will undergo ring closure to form the epoxide ring, and the other X or Y substituent can be any leaving group which is displaced under the reaction conditions to yield the desired epoxide product.

Thus, X and Y can be hydroxy, halo, for example chloro, bromo, iodo and the like, azido, lower alkanoyloxy, for example acetoxy, propionyloxy and the like, trihalomethyl substituted lower alkanoyloxy such as trichloroacetoxy, trifluoroacetoxy, 3,3,3 - trifluoropropionyloxy, 3,3,3-trichloropropionyloxy and the like, hydrocarbylsulfonyloxy such as lower alkanesulfonyloxy, for example methanesulfonyloxy ethanesulfonyloxy and the like, arylsulfonyloxy, for example phenylsulfonyloxy and the like, alkarylsulfonyloxy, for example tolylsulfonyloxy and the like, aralkylsulfonyloxy, for example benzyl sulfonyloxy and the like, aroyloxy, for example benzoyloxy, 4-tolyloxy, 2-naphthoyloxy and the like, aralkanoyloxy, for example benzylcarbonyloxy, naphthylcarbonyloxy and the like, tri-lower alkylammonium, for example trimethylammonium, triethylammonium and the like, N-cycloalkyl di-lower alkylammonium wherein the cycloalkyl radical is mono-nuclear cycloalkyl containing 5–6 nuclear carbon atoms such as cyclopentyl, cyclohexyl and the like, di-lower alkylsulfonium, for example dimethylsulfonium, diethylsulfonium, di-n-butylsulfonium and the like, aryloxy, for example phenoxy and the like, dialkoxyphosphino, for example di-lower alkoxyphosphino such as diethoxyphosphino and the like, N-(alkanesulfonyl)alkylamino or N-(alkarylsulfonyl)cycloalkylamino wherein the cycloalkyl radical is mononuclear cycloalkyl containing from 5–6 nuclear carbon atoms, for example N-(p-toluenesulfonyl) cyclohexylamino and the like, at least one of which X and Y radicals is hydroxy or other functionally equivalent oxygen-containing radical as, for example, an acyloxy group such as lower alkanoyloxy, trihalomethyl substituted lower alkanoyloxy, aroyloxy, aralkanoyloxy and the like, which under ring closure conditions, will form the desired epoxide ring.

Epoxide formation is preferably effected by treating the 1,2-disubstituted ethylphosphonic acid with a base having a pH equal to or greater than 7; suitable bases include, for example, alkali metal or alkaline earth metal hydroxides such as sodium hydroxide, potassium hydroxide, calcium hydroxide, magnesium hydroxide, etc., alkaline metal or alkaline earth metal carbonates or bicarbonates such as sodium carbonate, potassium carbonate, calcium carbonate, sodium bicarbonate, potassium bicarbonate, etc., basic metal oxides such as sodium oxide, potassium oxide, calcium oxide, cadmium oxide, gold oxide, silver oxide, etc., tertiary organic bases, for example tertiary alkylamines such as trimethylamine, triethylamine, pyridine, etc., quaternary ammonium bases, for example tri-lower alkylammonium alkoxides such as trimethylammonium methoxide, triethylammonium ethoxide, etc., alkali metal or alkaline earth metal alkoxides such as sodium methoxide, sodium ethoxide, potassium ethoxide, potassium tert. butoxide and the like or Lewis bases in aprotic solvents such as peroxide ion in acetonitrile or by passing a solution of the starting material through an ion-exchange column on the basic cycle. The desired substituted epoxyethylphosphonic acid compound is readily recovered from the resulting reaction mixture by procedures known in this art.

The 1,2-disubstituted ethylphosphonic acid compounds used as the starting materials in this method of preparing the desired epoxyethyl products can be prepared by processes known in this art as illustrated in the examples of this application.

The new compounds of this invention can also be prepared by other chemical methods known in this art using different starting materials and different methods of synthesis.

The esters of the new phosphonic acids of this invention are compounds of the general formula

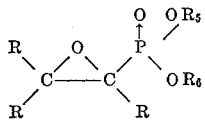

wherein R is the same as defined above, $R_5$ represents a hydrocarbyl group and $R_6$ represents $R_5$ or hydrogen which can be prepared by the procedures described herein starting with the appropriate ester.

When $R_5$ and/or $R_6$ in the foregoing formula represents a hydrocarbyl radical, such radical may be an aliphatic, cycloaliphatic, acyl, araliphatic, aromatic or heterocyclic radical which may, if desired, be further substituted. Thus, for example, it may be aliphatic such as substituted or unsubstituted alkyl, alkenyl or alkynyl, representative examples of which are alkyl such as methyl, propyl, isopropyl, t-butyl, hexyl, octyl, decyl, dodecyl, haloalkyl such as chloroethyl, fluoropropyl, bromoethyl and trichloroethyl, acyloxyalkyl such as acetoxymethyl, pivaloyl, propionoxymethyl, and benzoyloxyethyl, hydroxypropyl, aminomethyl, aminoethyl, alkylaminoalkyl such as dimethylaminomethyl or diethylaminopropyl, p-nitrobenzoylaminomethyl, carboalkoxymethyl, cyanoethyl, sulfonamidoethyl, phthalimidomethyl and methoxymethyl; alkenyl such as allyl, methallyl, vinyl, propenyl, hexenyl, octadienyl; alkynyl such as propargyl, ethynyl or chlorethynyl; cycloalkyl such as cyclohexyl, cyclohexenyl or cyclopropyl. When $R_5$ is aliphatic, it preferably has from 1–6 carbon atoms; i.e. substituted or unsubstituted lower alkyl or alkenyl.

Examples of $R_5$ and/or $R_6$ representing an araliphatic radical are aralkyl such as benzyl, phenethyl, phenylpropyl, p-halobenzyl, and o-, m- or p-alkoxybenzyl, nitrobenzyl, aminophenethyl, pyridylmethyl, furylmethyl, thienylpropyl and the like.

$R_5$ and $R_6$ may also represent an aryl radical such as phenyl, naphthyl or substituted phenyl or naphthyl, e.g. p-chlorophenyl, o-nitrophenyl, o,p-dihalophenyl, cyanophenyl, methoxyphenyl, aminophenyl and tolyl. The aryl radical is preferably a mononuclear aromatic residue. When $R_5$ and/or $R_6$ are heterocyclic, they may be heteroaromatic such as pyridyl, furyl, thienyl, thiazoyl or pyrazinyl, or alternatively may represent a hydrogenated hetero ring, examples of which are tetrahydrofuryl and piperazinyl.

When both $R_5$ and $R_6$ are hydrocarbyl, they may be joined together to afford a cyclic ester of the type

where W may be derived from a compound having two hydroxyl groups. Examples of W are

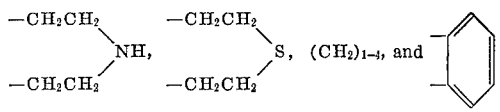

Those compounds which are acidic, i.e. the free acids and the mono-esters, may form salts and such salts constitute an especially preferred aspect of the invention because they are highly useful when the phosphonic acid compounds are employed as antibacterial agents.

The amides of the new epoxyethylphosphonic acids of this invention can be represented by the formula

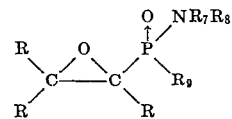

wherein R is the same as defined above, $R_7$ and $R_8$ represent hydrogen, acyl, hydrocarbyl or substituted hydrocarbyl and $R_9$ represents $NR_7R_8$ —OH, or SH. Also included are those cyclic derivatives where $NR_7R_8$ represents a residue of a cyclic primary or secondary amine such as morpholine, and the like as well as vicinal diamines such as phenylenediamine and substituted phenylenediamines.

When $R_7$ and $R_8$ in the foregoing formula represent hydrocarbyl or substituted hydrocarbyl, such substituents can be aliphatic, cycloaliphatic, araliphatic, aromatic, or heterocyclic radical which may, if desired, be further substituted. Thus, for example, it can be aliphatic such as substituted or unsubstituted alkyl, alkenyl or alkynyl, representative examples of which are alkyl such as methyl, propyl, isopropyl, t-butyl, hexyl, octyl, decyl, dodecyl, haloalkyl such as chloroethyl, fluoropropyl, bromoethyl and trichloroethyl, acylamidoalkyl such as acetylaminomethyl and benzoylaminoethyl, acyloxyalkyl such as acetoxymethyl, pivaloyloxyethyl and benzoyloxyethyl, a heterocyclic alkyl such as pyridylmethyl and piperidinomethyl, alkylamino such as aminomethyl and aminoethyl, alkylaminoalkyl such as dimethylaminomethyl, diethylaminopropyl, carboalkoxymethyl, cyanoethyl, sulfonamidoethyl, phthalimidomethyl and methoxymethyl; alkenyl such as allyl, methallyl, vinylpropenyl, hexenyl, octadienyl; alkynyl such as propargyl, ethynyl or chlorethynyl; cycloalkyl such as cyclohexyl, ₆cyclohexenyl or cyclopropyl. When $R_7$ or $R_8$ is aliphatic, it preferably has from 1-6 carbon atoms, i.e. substituted or unsubstituted lower alkyl, alkenyl or alkynyl.

Examples of $R_7$ or $R_8$ representing an araliphatic radical that might be mentioned are aralkyl such as benzyl, phenethyl, phenylpropyl, p-halobenzyl and o-, m- or p-alkoxybenzyl, nitrobenzyl, aminophenethyl, and the like.

$R_7$ and $R_8$ can also represent an aryl radical such as phenyl, o-nitrophenyl, o,p-dihalophenyl, cyanophenyl, methoxyphenyl, aminophenyl and tolyl, and preferably a mononuclear aromatic residue. When $R_7$ and $R_8$ are heterocyclic, it can be heteroaromatic such as pyridyl, furyl, thienyl, thiazolyl or pyrazinyl, or alternatively it can represent a hydrogenated hetero ring, examples of which are tetrahydrofuryl and piperazinyl.

When $R_7$ and/or $R_8$ are acyl, they are preferably lower alkanoyl or aroyl such as acetyl, propionyl, butyryl, hexanoyl, benzoyl, halobenzoyl, nitrobenzoyl and the like.

Those compounds of the foregoing formula of the amides which are acidic, i.e. the monoamides, can form salts. Examples of such salts are inorganic metallic salts such as the sodium, aluminum, potassium, ammonium, calcium, magnesium, silver and iron salts. Organic salts that may be mentioned as representative include the salts with primary, secondary or tertiary amines such as monoalkylamines, dialkylamines, trialkylamines and nitrogen-containing heterocyclic amines. Representative examples are salts with amines such as α-phenethylamine, diethylamine, quinine, brucine, lysine, protamine, arginine, procaine, ethanolamine, morphine, benzylamine, ethylenediamine, N,N' - dibenzylethylenediamine, diethanolamine, piperazine, dimethylaminoethanol, 2-amino-2-methyl - 1 - propanol, theophylline, esters of amino acids, and N-methylglucamine.

Also embraced by this invention are the pyrophosphonates, anhydrides and isohypophosphates represented by the formulas

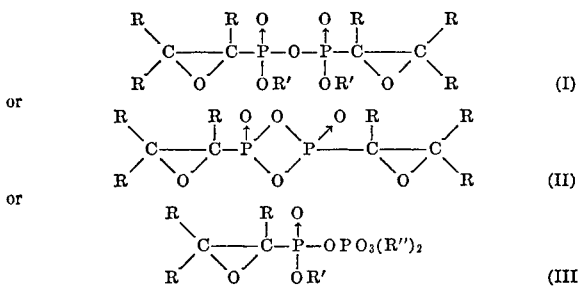

wherein R is the same as defined above, R' is hydrogen, a hydrocarbyl or substituted hydrocarbyl group, and R" is lower alkyl or a cation. Salts of these compounds where R' is hydrogen represent preferred anhydrides of this invention.

Although the dianhydrides are conveniently represented by II above, they can also exist in the forms

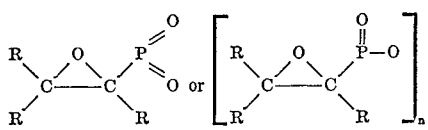

where R is as defined above and n is a positive integer.

The intermediate products of the formulas

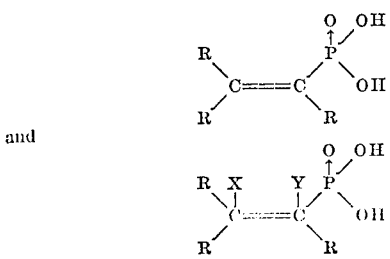

and the derivatives, especially the salts thereof, which are used in preparing the new substituted epoxyethylphosphonic acid compounds of this invention, and the processes for their preparation are additional embodiments of this invention.

A further embodiment of this invention comprises the thioic acids of the formulas

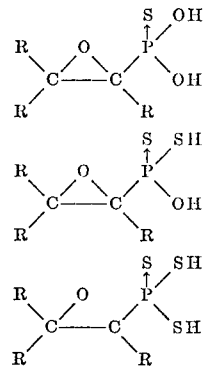

and the derivatives of these phosphonothioic, phosphonodethioic and phosphonotrithioic acids including the salts, esters, anhydrides and amides thereof.

The thioic acid compounds are prepared by processes analagous to those used in preparing the corresponding phosphonic acid compounds, i.e., by epoxidation of the corresponding vinyl compounds or by reaction of the appropriate disubstituted ethylphosphonothioic acid compound with a base. The intermediate compounds are prepared following procedures known in the art.

Example 1.—Preparation of trans-1,2-epoxy-3-hydroxypropyl-1-phosphonic acid (A) Diisopropyl 2,3-epoxypropyl-1-phosphonate.—Triisopropyl phosphite (152 g.) is added dropwise over a period of 2 hours to epibromohydrin (100 g.) maintained initially at 135° C. and rising to 145° C. by the end of the addition. The mixture is continuously stirred and volatiles swept out by a stream of nitrogen. After a total of 3 hours heating, the reaction mixture is twice fractionally distilled to yield diisopropyl 2,3-epoxy propyl-1-phosphonate, B.P. 69-73° C./0.05 mm., $n_D^{24°}$ 1.4335.

(B) Trans-diisopropyl 3-hydroxyprop - 1 - enyl-1-phosphonate.—A solution of diisopropyl 2,3-epoxypropyl-1-phosphonate (5.00 g.) in benzene (60 ml.) is dried by boiling out the azeotrope. The solution is cooled in ice to an internal temperature of 3° C., and with magnetic stirring, is treated dropwise with a 2% solution of potassium tert-butoxide in tert-butanol (8.8 ml., ⅕ mol. ratio) in 10 minutes under pure dry nitrogen, maintaining the temperature at 3° C. The ice bath is removed and the mixture is allowed to warm up to room temperature for 50 minutes more, before being cooled again in ice and stirred with an excess of saturated aqueous sodium dihydrogen phosphate. The benzene layer is separated and the aqueous layer extracted with fresh benzene (2× 10 ml.). The combined benzene solutions are dried over magnesium sulphate, filtered and evaporated at about 60° C./1 mm., leaving a colorless oil (4.57 g.) which is chromatographed in chloroform over a 30:1 column of silica gel. The column is monitored by gas-liquid chromatography, and trans-diisopropyl 3-hydroxyprop-1-enyl-1-phosphonate is eluted by chloroform/2% methanol in several fractions totaling 2.81 g., $n_D^{22°}$ 1.4522. The NMR spectrum is correct in all details.

(C) Trans-3-hydroxyprop-1-enyl-1-phosphonic acid.— Trans-diisopropyl 3-hydroxyprop - 1 - enyl-1-phosphonate (1.14 g.) is dissolved in aqueous concentrated hydrochloric acid (3 ml.) and the solution refluxed under nitrogen for 30 minutes. The solution is cooled, diluted with water (6 ml.) and extracted with ether (6 ml.). The aqueous layer is then evaporated to dryness at 100° C./0.5 mm. The residue is dissolved in water (3 ml.) and again evaporated. The process is repeated yielding finally a pale yellow syrup which very slowly crystallizes. Recrystallization twice from acetonitrile gives colorless leaflets of trans-3-hydroxyprop-1-enyl-1-phosphonic acid, M.P. 122–123° C. The NMR spectrum is correct in all details.

(D) Sodium trans - 1,2-epoxy-3-hydroxypropyl-1-phosphonate.—Aqueous 30% hydrogen peroxide (0.38 ml., 20% excess) is added in 1 minute to a magnetically stirred solution of trans-3-hydroxyprop-1-enyl-1-phosphonic acid (438 mg.) in water (4.4 ml.) at 55° C., containing sodium tungstate dihydrate (44 mg.) and one equivalent of sodium bicarbonate (267 mg.). After 1 hour and 45 minutes under nitrogen, the starch/potassium iodide test is negative, and more aq. 30% $H_2O_2$ (0.02 ml.) is added. The starch/KI test is now positive at 2 hours and 20 minutes and negative at 2 hours and 45 minutes. More aq. 30% $H_2O_2$ (0.02 ml.) is added, giving a positive test which is still persistent at 4 hours total reaction time, at which point the solution is evaporated at 40° C./0.1 mm., leaving a colorless syrup. This material is extracted with boiling methanol (5 × 50 ml.). The extracts are combined, filtered and evaporated at 80° C./0.1 mm. leaving sodium trans-1,2-epoxy-3-hydroxypropyl-1-phosphonate as a colorless, extremely hydroscopic foam. The NMR spectrum is consistent with the desired product.

The phosphonate so obtained is converted to the phosphonic acid by passing an aqueous solution of the phosphonate over a cation exchange resin on the hydrogen cycle and collecting the effluent containing the phosphonic acid.

Example 2.—Preparation of disodium 1,2-epoxy-cis and 1,2-epoxy-trans-2-carboxypropyl-1-phosphonate (A) Diethyl cis- and trans-2-carboethoxy-1-propenylphosphonate.—A slurry of sodium hydride (5.90 g., .135 mole 55% NaH in mineral oil) is washed with hexane and decanted three times to remove mineral oil. The sodium hydride is suspended in 300 ml. of benzene and 37.5 g. (.130 mole) of tetraethyl methanediphosphonate is added dropwise with stirring during 0.5 hr. After 1.5 hours of stirring at room temperature the clear yellow anion solution is added dropwise during 45 minutes to a stirred solution of 16.6 g. (0.143 mole) of ethyl pyruvate in 200 ml. benzene. The mixture becomes cloudy and yellow and a yellow oil appears on the walls of the flask. The reaction is slightly exothermic, and the temperature rises to a maximum of 35° C.

The mixture is stirred for 15.5 hours at room temperature. Water (200 ml.) is added, the mixture is shaken and the layers separated. The benzene solution is dried with sodium sulfate and evaporated under reduced pressure to afford diethyl cis- and trans-2-carboethoxy-1-propenylphosphonate as a yellow-orange liquid. Vapor phase chromatography at 160° C. shows two peaks in the ratio 53:47.

The isomers are separated by elution chromatography using 180 g. silica gel G and 150 g. Super-cel in a column of I.D. 70 mm. The column is charged with 5.00 g. of the isomeric mixture and eluted with chloroform. Fractions of 75 ml. are collected once elution of product begins. One pure isomer (1.88 g.) appears in fractions 3–20 and the other pure isomer (2.40 g.) in fractions 24–38. The isomers are distilled and characterized.

Diethyl cis-carboethoxy-1-propenylphosphonate ($CH_3$, H cis); B.P. 82–3° C. at 0.08 mm.;

NMR $^{TMS}_{CDCl_3}$: 1.32δ double triplet, J=7 c.p.s. (9H); 2.11δ, triplet, J=1.5 c.p.s. (3H); 4.17δ, six lines, J=7 c.p.s. (6H) and 5.76 double quartet, J=14.5 and 1.5 c.p.s. (1H); UV$^{MeOH}$ no max. between 210–250 mµ.

Diethyl trans-2-carboethoxy - 1 - propenylphosphonate ($CH_3$, H trans); B.P. 85–6° C. at 0.08 mm.;

NMR $^{TMS}_{CDCl_3}$: 1.32δ triplet, J=7 c.p.s. (3H); 1.35δ, triplet, J=7 c.p.s. (6H); 2.27δ, double doublet, J=3.7 and 1.5 c.p.s. (3H); 4.18δ, complex nine lines (6H); 6.67δ, double quartet, J=16 and 1.3 c.p.s. (1H); UV$^{MeOH}$ λ$_{max.}$ 214 mµ (E percent 470).

(B) Cis- and trans-2-carboxy - 1 -propenylphosphonic acid.—A solution of 2.27 g. of diethyl cis-2-carboethoxy-1-propenylphosphonate in 18 ml. concentrated hydrochloric acid is heated at 100° C. for 11 hours. Upon evaporating to dryness the residue crystallizes. The residue is dissolved in water and re-evaporated several times to remove remaining hydrochloric acid. After drying in vacuo the cis-2-carboxy-1-propenylphosphonic acid is found to melt at 95–143° C.

An analytical sample is recrystallized from acetonitrile: M.P. 138–40° C.;

NMR $^{PhH}_{D_2O}$: 2.10δ triplet, J=1.5 c.p.s. (3H); 6.04δ, double quartet J=15 and 1.5 c.p.s. (1H); UV$^{MeOH}$ λ$_{max.}$ 211 mµ (E percent 373).

A solution of 1.55 g. of diethyl trans-2-carboethoxy-1-propenylphosphonate in 12 ml. concentrated hydrochloric acid is heated at 100° C. for 15 hours. The trans-2-carboxy-1-propenylphosphonic acid is recovered as described above and recrystallization from acetonitrile gives the analytical sample: M.P. 154–5° C.;

NMR $^{PhH}_{D_2O}$: 2.18δ double doublet, J=3.8 and 1.5 c.p.s. (3H) and 6.82δ, double quartet, J=17 and 1.5 c.p.s. (1H); UV$^{MeOH}$ λ$_{max.}$ 215 mµ (E percent 698).

(C) Disodium 1,2-epoxy-cis- and 1,2-epoxy-trans-2-carboxypropyl - 1 - phosphonate.—Cis - 2 - carboxy-1-propenylphosphonic acid (336.8 mg., 2.03 mmoles) is neutralized to pH 4–4.5 with 1.5 ml. of 2.5 N aq. sodium hydroxide. Sodium tungstate dihydrate (12.7 mg., 0.04 mmole) is added and dissolved, and 0.40 ml. of 30% hydrogen peroxide is added. After 6 hours at room temperature with occasional swirling the residue is lyophilized and an NMR obtained. Reaction is found to be complete.

The sample is dissolved in 2 ml. of water, brought to pH 6.8 with 2.5 N aq. sodium hydroxide and lyophilized to give a white foamy solid, which gives a positive test with starch-iodide paper.

The residue is dissolved in water, cooled in an ice bath and 10% aq. sodium sulfite is added dropwise to destroy excess peroxide. Lyophilization yields disodium 1,2-epoxy-cis-2-carboxypropylphosphonate as a white residue with negative starch-iodide test.

NMR $^{PhH}_{D_2O}$: 1.60δ doublet, J=1.3 c.p.s.; 2.87δ, doublet, J=19 c.p.s.

Trans-2-carboxy - 1 - propenylphosphonic acid (330.8 mg., 2.00 mmoles) is brought to pH 4–4.5 with 1.50 ml. of 2.5 N aq. sodium hydroxide. Sodium tungstate dihydrate (13.4 mg.) and 0.40 ml. of 30% hydrogen peroxide are added and the solution is maintained at room temperature for 3.5 hours with occasional swirling. Work-up as described above affords disodium 1,2-epoxy-trans-2-carboxypropylphosphonate as a white solid.

NMR $^{PhH}_{D_2O}$: 1.74δ singlet (3H); 2.91δ, doublet, J=19.5 c.p.s. (1H).

Example 3.—Preparation of monosodium trans-1-carboxamide-1,2-epoxypropyl-1-phosphonate (A) Diethyl trans-1-cyano-1-propenylphosphonate.—To an ice-cold solution of 17.7 g. (0.10 mole) of diethyl cyano-methylenephosphonate, 0.5 ml. of piperidine and 100 ml. of methanol is added all at once 6.2 ml. (0.11 mole) of acetaldehyde. The solution is heated at 70° C. under nitrogen for 30 minutes. Most of the methanol is removed on the rotary evaporator (bath 20° C.), and the residue is poured into 250 ml. of ice water containing 50 ml. of 2 N hydrochloric acid and extracted with ether (3× 100 ml.). The combined ether extracts are washed with water (2× 50 ml.) and saturated sodium chloride solution (1× 50 ml.) and dried over magnesium sulfate. Removal of the solvent under reduced pressure gives 16.1 g. of yellow liquid which contains by gas-liquid chromatography about 50% of the diene, diethyl 1-cyano-1,3-pentadienylphosphonate, 40% of the desired diethyl 1-cyano-1-propenylphosphonate and 10% of the starting material, diethyl cyanomethylenephosphonate. The pure diethyl trans-1-cyano-1-propenylphosphonate is obtained by a series of three chromatographies on silica gel with chloroform as eluent. A sample is evaporatively distilled at 85° C./0.15 mm. The NMR and IR spectra are consistent with the postulated structure.

(B) Monosodium trans-1-carboxamide-1,2-epoxypropyl-1-phosphonate.—A solution of 1.50 g. of diethyl trans-1-cyano - 1 - propenylphosphonate and 3.75 ml. of chlorotrimethylsilane is heated at 150° C. for 5 hours in a Carius tube. The contents of the tube are transferred to a round-bottomed flask with about 20 ml. of ether and the volatile material is removed on a rotary evaporator (bath 60° C.). The brown, syrupy residue is stirred with 50 ml. of water for 30 minutes at room temperature. The aqueous mixture is extracted with chloroform (2× 10 ml.) and ether (2× 20 ml.), and the water is removed (rotary evaporator and oil pump) to give trans-1-cyano-1-propenylphosphonic acid as a brown syrup. The NMR spectrum lacks any ethyl ester resonances and is consistent with the desired product.

A solution of 832 mg. (5.66 mmoles) of trans-1-cyano-1-propenylphosphonic acid, 74 mg. (0.24 mmoles) of sodium tungstate dihydrate, 475 mg. (5.66 mmoles) of sodium bicarbonate and 0.75 ml. (7.28 mmoles) of 30% hydrogen peroxide in 8.5 ml. of water is heated at 55° C. for 4 hours. The reaction mixture is diluted with 30 ml. of water and freeze dried. The residue is triturated with 15 ml. of methanol, filtered and the methanol removed under reduced pressure to give a colorless glass. Trituration with chloroform causes it to crystallize and it is recrystallized from chloroform-methanol to give trans-1-carboxamido - 1,2 - epoxypropyl-1-phosphonate monosodium salt as a white powder, decomp. 240–250° C. The IR and NMR spectra are in accord with the postulated structure.

Example 4.—Preparation of dicyclohexylammonium cis-1,2-epoxy-2-phenylethylphosphonate Phenylethynylphosphonic acid is esterified in ether solution with diazomethane, and distilled, the major fraction of this dimethyl ester being obtained at 140–150° C. and 0.28–0.35 mm. A 5 g. sample of this dimethyl ester is shaken with 150 mg. 10% Pd/CaCO$_3$ in 50 ml. methanol in a Parr apparatus until the theoretical amount of hydrogen is taken up. After filtration and evaporation of the solvent, the residue is distilled under reduced pressure to obtain pure dimethyl cis-2-phenylvinylphosphonate boiling at 105–110° C. at 0.3 mm. A 5 g. sample of this product is heated for 16 hours with 15 ml. of chlorotrimethylsilane at 95° C.; the mixture being concentrated under reduced pressure, stirred for 30 minutes with water, extracted several times with chloroform, and the aqueous phase taken to dryness under reduced pressure to give 3.9 g. of crude cis-2-phenylvinylphosphonic acid. Repeated recrystallization from ether gives a sample with M.P. 139–141° C. A 3.0 g. sample is dissolved in 16.4 ml. water with enough concentrated ammonium hydroxide to give pH 6. To this is added 159 mg. sodium tungstate dihydrate followed by 3.3 ml. 30% hydrogen peroxide; slight cooling being needed to keep the temperature below 35° C. After standing for 1 hour, the reaction mixture is lyophilized. A 3.54 g. sample of the product is dissolved in 34 ml. of methanol and treated with 6.46 g. of dicyclohexylamine in 5 ml. of methanol, stirred for 5 minutes and taken to dryness under reduced pressure maintaining the heating bath at no more than 35° C. The residue was crystallized from 25 ml. acetone and 125 ml. of ether. Further recrystallization from 5% methanolic benzene and finally isopropyl alcohol gave pure dicyclohexylammonium cis-1,3-epoxy-2-phenylethylphosphonate, M.P. 175–176° C.

Example 5.—Preparation of benzylammonium trans-1,2-epoxy-3-phenylpropylphosphonate To 29 g. of tetraethyl methylenediphosphonate in 100 ml. of THF cooled to −78° C. is added dropwise over 1 hour 40.2 ml. of 2.51 N n-butyl lithium in hexane. To the resultant clear solution is added 12 g. of freshly distilled phenylacetaldehyde in 100 ml. of THF, dropwise, over 1 hour, the temperature being maintained at −78° C. After stirring for another 30 minutes at −78° C., the reaction is allowed to warm to room temperature and is allowed to stand for 16 hours. It is then filtered, concentrated, and the residue distilled under reduced pressure. The resulting diethyl trans-3-phenyl-1-propenylphosphonate is heated in a sealed tube with 30 ml. of chlorotrimethylsilane for 3 hours at 130° C. The product is concentrated under reduced pressure, stirred for 1 hour with several volumes of water, sodium bicarbonate being added from time to time to keep the liberated acid in solution. The mixture is extracted several times which chloroform and the aqueous phase acidified. After several recrystallizations, pure trans-3-phenyl-1-propenylphosphonic acid, M.P. 108–110° C., is obtained. Treatment of a sample with one equivalent of dicyclohexylamine and recrystallization from methanolisopropyl alcohol gave the pure salt, M.P. 192–194° C.

A 2.0 g. sample of the salt is dissolved in 25 ml. of water with adjustment to pH 5.5 with ammonium hydroxide; 200 mg. sodium tungstate dihydrate is added and the clear solution treated with 3.0 ml. of 30% hydrogen peroxide. After standing 4 hours, the reaction mixture is lyophylized to give foam with a strongly positive starch/iodide reaction. Stirring the material with concentrated ammonium hydroxide and lyophylization gives a foam with a weakly positive starch/iodide reaction. The crude ammonium trans-1,2-epoxy-3-phenylpropylphosphonate is dissolved in water, cooled to 0° C., and passed through 40 ml. of Dowex-50 resin (H form) chilled to the same temperature. The eluate and subsequent ice water washes are all collected in a chilled flask containing 1.18 g. of benzylamine. The resultant solution is filtered, lyophylized, and the resultant foam crystallized several times from 1:4 methanol:isopropyl alcohol, and finally from pure methanol to give pure benzylammonium salt, M.P. 174–176° C.

Example 6.—Preparation of disodium trans-2-carboxyethyl-1-phosphonate (A) Diethyl 2 - carbomethoxyvinylphosphonate.—To methyl α-bromoacrylate at 0° C. under nitrogen is added dropwise with vigorous mechanical stirring, one equivalent of triethylphosphite. The ice bath is removed after the addition of the phosphite and the mixture heated slowly to distill out the alkyl bromide. The residue is then distilled under high vacuum to give diethyl 2-carbomethoxyvinylphosphonate distilling at 105° C. at 0.7 mm.

(B) Trans-2-carboxyvinylphosphonic acid.—Diethyl 3-carbomethoxyvinylphosphonate is hydrolyzed for 15 hours at 135° C. in 2:1 HCl:water yielding 90% crystalline trans 2-carboxyvinylphosphonic acid. A second crop of less pure product is obtained in about 10% yield. After recrystallization from acetonitrile/acetone, the phosphonic acid melts at 182–5° C.

(C) Disodium trans 2 - carboxyepoxyethyl-1-phosphonate.—The trans 2-carboxyvinylphosphonic acid is cooled and 2.5 N NaOH added until the pH is between 4.0 and 5.0. Then 0:1 mole equivalents of Na$_2$WO$_4$.2H$_2$O is added with stirring. Finally, 3 equivalents of 30% H$_2$O$_2$ is added. Swirling occasionally during 54 hours and evaporating under reduced pressure below 40° C. yields disodium trans 2-carboxy-epoxyethyl-1-phosphonate characterized by its distinctive NMR spectrum.

Example 7.—Preparation of cis disodium 2-carboxyepoxyethyl-1-phosphonate (A) Dimethyl 2-carbomethoxyvinylphosphonate.—To methyl α-bromoacrylate under nitrogen at 0° C. is added dropwise one equivalent of trimethyl phosphite with vigorous mechanical stirring. After the addition is complete the reaction mixture is heated slowly to remove the alkyl bromide. The residue is then distilled under high vacuum to obtain the dimethyl 2-carbomethoxyvinylphosphonate which distilled at 113.5–115° C. at 0.7 mm.

(B). Cis 2-carboxyvinylphosphonic acid.—The dimethyl 2-carbomethoxyvinylphosphonate, prepared as described above and containing about 30% of the cis form, is irradiated in benzene (½ g. per 20 ml. of benzene) at 254 mμ for 21 hours. Evaporation of the irradiated solution affords dimethyl 2-carbomethoxyvinylphosphonate containing about 55% of the cis form. This product is chromatographed over silica gel using 3% methanol in methylene chloride to elute the cis ester which is recovered by evaporation of the solvent. The cis dimethyl 2-carboxymethylvinylphosphonate is refluxed with 10 equivalents of chlorotrimethylsilane in the presence of one equivalent of triethylamine for 70 hours. Evaporation of this solution, solution of the residue in benzene, and evaporation of the benzene affords the ditrimethylsilyl ester. This ester is hydrolyzed in water at room temperature for one hour and an aqueous solution of cis 2-carboxymethylvinylphosphonic acid is obtained after extraction of the aqueous solution with chloroform. This solution is evaporated to dryness and the residue is dissolved in 4:1 ethanol and water, three equivalents of KOH is added and the resulting solution heated under reflux for one-half hour. The reaction mixture is evaporated to dryness under reduced pressure and the residue is dissolved in water. The aqueous solution is acidified to pH 1.0 and then stirred in a slurry of ion exchange resin (H$^+$) resin (10 equivalents for 40 minutes). The slurry is then filtered and the filtrate is evaporated to dryness under reduced pressure. The residue after crystallization from acetonitrile affords cis 2-carboxyvinylphosphonic acid melting at 128–130° C.

(C) Cis disodium 2-carboxy-epoxyethyl-1-phosphonate.—Cis 2-carboxyvinylphosphonic acid is epoxidized using the procedure described in Example 6(C) to afford disodium cis 2-carboxy-epoxyethyl-1-phosphonate which is characterized by its NMR spectrum.

Example 8.—Preparation of trans 3,3,3-trifluoro-1,2-epoxypropyl phosphonic acid 740 g. of 1,1,1-trifluoro-2,3-dichloropropene and 204 g. of triisopropylphosphite is refluxed overnight under nitrogen. Distillation of the crude reaction mixture yields 89 g. of diisopropyl 3,3,3-trifluoro-1,2-dichloroprop-1-enylphosphonate, B.P. 98–100° C./4 mm. The compound consists of a mixture of cis and trans isomers in about 50:50 ratio.

50 g. of this phosphonate in 140 ml. of anhydrous ether is treated with a solution of 34 g. of piperidine (2.5 molar excess) in 70 ml. of ether. The reaction mixture is kept at room temperature for 6 days, when vapor phase chromatography shows the complete disappearance of the starting dichloro compound. After removing the piperidinehydrochloride the ether solution of enamine, diisopropyl 1-chloro-2-piperidyl-3,3,3-trifluoro-prop-1-enyl-phosphonate is treated with concentrated HCl on cooling with ice water. The chloroketone, diisopropyl 1-chloro-2-oxo-3,3,3-trifluoro-propylphosphonate (40 g.; 87%) which precipitates instantaneously under the form of the hydrate (IR, NMR) is filtered, dried and recrystallized from hexane, M.P. 90–91° C.

To a slurry of 6.2 g. of the chloroketone in 25 ml. of H$_2$O is added dropwise a solution of 0.3 g. of sodium borohydride in 1 ml. of H$_2$O with shaking and cooling in ice water. After 2 hours the slurry is filtered and washed with water. Recrystallization from petroleum ether yields 3.6 g. (56%) of pure diisopropyl trans 1-chloro-2-hydroxy-3,3,3-trifluoro-propylphosphonate, M.P. 67–8° C.

3 g. of this chlorohydrin in 30 ml. of conc. HCl is kept at 100° C. for 2 hours. Removal of HCl under reduced pressure yields 1.5 g. of trans 1-chloro-2-hydroxy-3,3,3-trifluoro-propylphosphonic acid, M.P. 215° C.

1.1 g. of this phosphonic acid is treated with 2.5 N sodium hydroxide to pH 13 and left at room temperature for 4 hours. The clear solution is neutralized with H$^+$ resin to pH 7 and lyophilized, yielding 1.0 g. of trans 3,3,3-trifluoro-1,2-epoxypropylphosphonic acid which is characterized by its NMR spectrum.

Example 9.—Preparation of monosodium 1-hydroxymethylepoxyethyl-1-phosphonate (A) Diisopropyl 1-acetoxy-3-chloro-2-hydroxypropyl-2-phosphonate.—A mixture of 30 g. of 1-acetoxy-3-chloropropanone and 33 g. of diisopropylphosphite is heated under nitrogen at 60° C. for 7 days. The mixture is dissolved in ether, washed with aqueous sodium chloride and dried over magnesium sulfate. Removal of the solvent under reduced pressure gives diisopropyl 1-acetoxy-3-chloro-2-hydroxypropyl-2-phosphonate.

(B) 3-chloropropyl-2,-diol-2-phosphonic acid.—A solution of 10 g. of diisopropyl 1-acetoxy-3-chloro-2-hydroxypropyl-2-phosphonate in 120 ml. of concentrated hydrochloric acid is heated at 100° C. for 1 hour. The reaction mixture is evaporated at reduced pressure and the hydrochloric acid removed from the residue by addition and evaporation of four 50 ml. portions of water. The residue, 3-chloropropyl-1,2-diol-2-phosphonic acid, is dried at 60° C./0.1 mm.

(C) Monosodium 1-hydroxymethylepoxyethyl-1-phosphonate.—To a solution of 1.89 g. of 3-chloropropyl-1,2-diol-2-phosphonic acid is added a solution of 1.20 g. of sodium hydroxide in 2 ml. of water. The reaction mixture is kept at 50° C. until the pH is constant. The pH is adjusted to 4 with 2 N HCl and the resulting mixture is freeze dried to give monosodium 1-hydroxymethylepoxyethyl-1-phosphonate.

Example 10.—Preparation of 1-formylepoxethyl-1-phosphonic acid monosodium salt

To a stirred suspension of 1.76 g. of monosodium 1-hydroxymethylepoxyethyl-1-phosphonate in 50 ml. of pyridine is added 4.43 g. of powdered lead tetraacetate. The deep red suspension is stirred at room temperature for 24 hours. The solid lead diacetate is then filtered off and washed with ethanol. The filtrate is evaporated under reduced pressure to give 1-formylepoxyethyl-1-phosphonic acid monosodium salt.

Example 11.—Preparation of disodium 1-methylsulfonyl-1,2-epoxyethyl-1-phosphonate (A) Methyl 1,2-dichloroethyl sulfide.—A mixture of 10 g. (0.16 mole) of vinyl chloride, 13.2 g. (0.16 mole) of methylsulfenyl chloride and 25 ml. acetonitrile is sealed in a Pyrex Carius tube and irridated with an ultraviolet lamp. After irradiation, the tube contents are distilled until a head temperature of 50° C. is reached. The distillation is interrupted, and the residue is poured into a large excess of water. The organic layer is separated and dried with magnesium sulfate. Removal of the drying agent affords the desired sulfide, methyl 1,2-dichloroethyl sulfide.

(B) Diisopropyl 1-methylthio-2-chloroethyl-1-phosphonate.—A solution of 14.5 g. (0.10 mole) of methyl 1,2-dichloroethyl sulfide and 20.8 g. (0.10 mole) of triisopropyl 1-methylthio-2-chloroethyl-1-phosphonate in bubbled through the solution. Formation of isopropyl chloride in a distillation condenser attached to the reaction flask provides evidence that reaction is occurring.

Heating is continued until no more isopropyl chloride distills from the reaction mixture. The residue contains the desired phosphonate ester, diisopropyl 1-methylthio-2-chloroethyl-1-phosphonate.

(C) Diisopropyl 1-(methylthio)-vinyl-1-phosphonate.—To a well-stirred solution of 13.7 g. (0.05 mole) of diisopropyl 1-methylthio-2-chloroethyl-1-phosphonate in 150 ml. of ether maintained at 0° C. is added dropwise 5.0 g. (0.05 mole) of triethylamine in 25 ml. of ether. The reaction mixture is allowed to warm gradually to room temperature. Stirring is continued until precipiation appears complete. The mixture is filtered to remove triethylammonium chloride and the ether is removed in vacuo to afford the desired enol thioether, diisopropyl 1-(methylthio)-vinyl-1-phosphonate.

(D) Diisopropyl 1-(methylsulfonyl)-vinyl - 1 - phosphonate.—To a well-stirred solution of 8.6 ml. (0.10 mole (of 30% hydrogen peroxide in 220 ml. of glacial acetic acid kept at about 0.° C. is added dropwise 9.0 g. (0.04 mole) of diisopropyl 1-(methylthio)-vinyl-1-phosphonate. The reaction mixture is maintained at 0° C. until the substrate phosphonate ester is consumed as determined by vapor phase chromatography. Excess peroxide is destroyed by dropwise addition of saturated aqueous sodium sulfite and most of the acetic acid is removed by evaporation in vacuo at room temperature. The residue is poured into 200 ml. of cold water and the mixture is extracted with chloroform. The chloroform extract is washed with water, dried with sodium sulfate and concentrated under reduced pressure to afford a liquid residue. Distillation of the residue under reduced pressure affords the desired sulfone, diisopropyl 1-(methylsulfonyl)-vinyl-1-phosphonte.

(E) 1-(methylsulfonyl)-vinyl-1-phosphonic acid.—A well-stirred mixture of 3.0 g. of diisopropyl 1-(methylsulfonyl)-vinyl-1-phosphonate and 25 ml. of concentrated hydrochloric acid is heated at 100° C. for one hour. Hydrochloric acid is removed by evaporation in vacuo. The residue is dissolved in 10 ml. of water and re-evaporated. Repetition of the solution-evaporation procedure three times removes hydrochloric acid. The viscous residue is dried in vacuo to afford the desired phosphonic acid, 1-(methylsulfonyl)-vinyl-1-phosphonic acid.

(F) Disodium 1-methylsulfonyl - 1,2 - epoxyethyl - 1 - phosphonate.—A solution of 3.1 g. (0.02 mole) of 1-(methylsulfonyl)-vinyl-1-phosphonic acid in 15 ml. of water is tritrated with dilute aqueous sodium hydroxide to pH 8. Hydrogen peroxide (30%, 1.7 ml., 0.02 mole) is added and the pH is maintained at 8–8.5 by continuous addition of dilute aqueous sodium hydroxide. Stirring is continued until peroxide is consumed. Lyophilization of the reaction mixture affords the desired epoxide, disodium 1-methylsulfonyl-1,2-epoxyethyl-1-phosphonate.

In an analogous manner beginning with trifluoromethyl- and trichloromethylsulfenyl chloride the corresponding trifluoromethylsulfone and trichloromethylsulfone, namely 1 - trifluoromethylsulfonyl - 1,2 - epoxyethyl - 1 - phosphonic acid and 1-trichloromethylsulfonyl-1,2-epoxyethyl-1-phosphonic acid and their salts, can be prepared.

Example 12.—Preparation of disodium 1-chloromethyl-1,2-epoxyethyl-1-phosphonate (A) Diisopropyl 1,3-dichloro-2-hydroxypropyl-2-phosphonate.—A mixture of 12.7 g. (0.1 mole) of 1,1'-dichlorooacetone and 16.6 g. (0.1 mole) of diisopropyl phosphite is heated gradually in an oil bath. Reaction occurs at 100–120° C. as evidenced by disappearance of diisopropyl phosphite which is followed by vapor phase chromatography. When no starting material remains, heating is halted and the crude product, diisopropyl 1,3-dichloro-2-hydroxypropyl-2-phosphonate is used in the following reaction.

(B) 1,3-dichloro-2-hydroxypropyl-2-phosphonic acid.—A well-stirred mixture of 3.0 g. of diisopropyl 1,3-dichloro-2-hydroxypropyl-2-phosphonate and 25 ml. concentrated hydrochloric acid is heated at 80° C. for one hour. After cooling the mixture is extracted with chloroform to remove unreacted starting material. The acid solution is evaporated under reduced pressure with heating and a viscous oil remains. The oil is dissolved in 10 ml. of water and re-evaporated. This solution-evaporation procedure is repeated three times in order to remove hydrochloric acid. Drying of the residue in vacuo affords the desired phosphonic acid, 1,3-dichloro-2-hydroxypropyl-2-phosphonic acid.

(C) Disodium 1-chloromethyl-1,2-epoxyethyl-1-phosphonate.—A solution of 2.93 g. (0.01 mole) of 1,3-dichloro-2-hydroxypropyl-2-phosphonic acid in 25 ml. water is titarated with 0.1 N aqueous sodium hydroxide to pH 9. Additional increments of base are added to keep the pH at 8–9. When no further pH change occurs the solution is lyophilized to afford disodium 1-chloromethyl-1,2-epoxyethyl-1-phosphonate.

When 1,1'-dichloroacetone is replaced with 1,1,1'-trichloroacetone, 1,1'-dibromoacetone and 1,1,1'-tribromoacetone in the above described processes, the corresponding 1-dichloromethyl-, 1-bromomethyl-, and 1-dibromomethyl-1,2-epoxyethylphosphonates are obtained. Correspondingly, 1-fluoromethyl-1,2-epoxyethyl and 1-difluoromethyl-1,2-epoxyethylphosphonate are prepared using 1-chloro-1'-fluoroacetone and 1-chloro-1',1'-difluoroacetone as the starting materials. 1-dihalomethyl-1,2-epoxyethylphosphonates with two different halogen substituents such as 1-chlorofluoromethyl-, 1-bromofluoromethyl- and 1-bromochloromethyl are prepared from 1,1'-dichloro-1-fluoroacetone, 1-1'-dibromo-1-fluoroacetone and 1,1'-dibromo-1-chloroacetone in the same way.

Example 13.—Preparation of disodium 1-trifluoromethyl-1,2-epoxyethyl-1-phosphonate (A) Diisopropyl 1,1,1-trifluoro-3-chloro-2-hydroxypropyl-2-phosphonate.—To 14.7 g. of 1,1,1-trifluoro-1'-chloroacetone is added 16.6 g. of diisopropyl phosphite and the resulting reaction mixture is heated gradually to about 100–120° C. The course of the reaction is followed by vapor phase chromatography and when no diisopropylphosphite is detected indicating completion of the reaction, the heating is halted. The eraction product containing the diiisopropyl 1,1,1-trifluoro-3-chloro-2-hydroxypropyl-2-phosphonate is used in the next step.

(B) 1,1,1 - trifluoro-3-chloro-2-hydroxypropyl-2-phosphonic acid.—A stirred mixture of 3.0 g. of diisopropyl 1,1,1-trifluoro-3-chloro-2-hydroxypropyl - 2 - phosphonate and 25 ml. of concentrated hydrochloric acid is heated to 85° C. for one and one-half hours. The resulting cooled reaction mixture is extracted with 3× 10 ml. of chloroform to remove unreacted starting material and is then evaporated under reduced pressure to yield a viscous oil. The oil is dissolved in 10 ml. of water and re-evaporated with warming under reduced pressure. This procedure is then repeated twice more when all of the hydrochloric acid is removed. Drying of the residue further in vacuo affords 1,1,1 - trifluoro - 3-chloro-2-hydroxypropyl-2-phosphonic acid.

(C) Disodium 1-trifluoromethyl-1,2-epoxyethyl-1-phosphonate.—To an aqueous solution of 3.15 g. of 1,1,1-trifluoro-3-chloro-2-hydroxypropyl-2-phosphonic acid in 25 ml. of water is added 0.1 N aqueous sodium hydroxide to pH 9; additional alkali being added to maintain the pH at about 8–9. The resulting solution is lyophilized to afford disodium 1-trifluoromethyl-1,2-epoxyethyl-1-phosphonate.

Example 14.—Preparation of sodium 1-(2-pyridyl)-epoxyethyl-1-phosphonate (A) 1-chloro-1-(2-pyridyl)ethylphosphonic acid.—2-acetylpyridine (10.0 g.) and 14.2 g. of phosphorous trichloride are mixed together and after standing for two hours 25 g. of glacial acetic acid is added. The mixture is kept overnight at room temperature and dry hydrogen chloride is bubbled in for 20 minutes. On standing the mixture solidifies to a hard mass. The solid is broken up and the liquid is removed by filtration. The 1-chloro-1-(2-pyridyl)ethylphosphonic acid obtained is recrystallized from ether.

(B) 1-(2-pyridyl)vinylphosphonic acid.—1-chloro-1-(2-pyridyl)ethylphosphonic acid (22.3 g., 0.10 mole) is dissolved in 100 ml. of water and triethylamine (32 g., 0.31 mole) is added. The solution is warmed on a steam bath until formation of chloride ion (as determined by silver nitrate test) is complete. The solution is passed through a column of cation exchange resin in the hydrogen ion form, and the column is eluted with water until the eluate becomes almost neutral to litmus paper. Evaporation of the eluate affords 1-(2-pyridyl)-vinylphosphonic acid.

(C) Sodium 1-(2-pyridyl)epoxyethyl-1-phosphonate.— 1-(2-pyridyl)vinylphosphonic acid (18.7 g., 0.10 mole) is dissolved in 100 ml. water and the pH is adjusted to 5.5 with aqueous sodium hydroxide. Sodium tungstate dihydrate (1.65 g., 0.005 mole) and 10.3 ml. (0.12 mole) of 30% hydrogen peroxide is added. The reaction mixture is warmed to 50° C. and maintained there until the peroxide is consumed (negative starch/iodide test). The solution is evaporated in vacuo to afford a residue of sodium 1-(2-pyridyl)epoxyethyl-1-phosphonate.

Example 15.—Preparation of sodium 1-(3-pyridyl)epoxyethyl-1-phosphonate and sodium 1-(4-pyridyl)epoxyethyl-1-phosphonate When the process of Example 14 is repeated using 3-acetylpyridine and 4-acetylpyridine in place of 2-acetylpyridine, sodium 1-(3-pyridyl)epoxyethyl-1-phosphonate and sodium 1-(4-pyridyl)epoxyethyl-1-phosphonate are obtained.

Example 16.—Preparation of sodium 1-(2-thienyl)epoxyethyl-1-phosphonate (A) 1-chloro-1-(2-thienyl)ethyl-1-phosphonate acid.— A mixture of 10.5 g. of 2-acetylthiophene and 14.5 g. of phosphorous trichloride is allowed to stand for about three hours and then 25 g. of glacial acetic acid is added. After standing overnight at room temperature, dry hydrogen chloride is bubbled through the mixture for twenty minutes. The resulting solid product is removed by filtration and crystallized from ether to afford pure 1-chloro-1-(2-thienyl)ethyl-1-phosphonic acid.

(B) 1-(2-thienyl)vinylphosphonic acid.—To a solution of 22.5 g. of 1-chloro-1-(2-thienyl)ethyl-1-phosphonic acid in 100 ml. of water is added 32 g. of triethylamine. The resulting reaction mixture is warmed until the formation of chloride ion is complete. The solution is then passed through a column of cation exchange resin in the hydrogen ion form, and the column is eluted with water until the eluate becomes almost neutral to litmus paper. Evaporation of the eluate affords 1-(2-thienyl)vinylphosphonic acid.

(C) Sodium 1-(2-thienyl)epoxyethyl-1-phosphonate.— A solution of 19.1 g. of 1-(2-thienyl)vinylphosphonic acid in 100 ml. of water is adjusted to pH 5.5 with aqueous sodium hydroxide and 1.65 g. of sodium tungstate dihydrate and 10.3 ml. of 30% hydrogen peroxide is added. The reaction mixture is then warmed to 50° C. and maintained at this temperature until the peroxide is consumed. Evaporation of the resulting solution in vacuo affords solid sodium 1-(2-thienyl)epoxyethyl-1-phosphonate.

Example 17.—Preparation of sodium 1-(3-thienyl)epoxyethyl-1-phosphonate

When the process of Example 16 is repeated using 3-acetylthiophene in place of 2-acetylthiophene, sodium 1-(3-thienyl)epoxyethyl-1-phosphonate is obtained.

Example 18.—Preparation of sodium 1-amino-2,3-epoxypropyl-2-phosphonate (A) 1-cyanovinyl-1-phosphonic acid.—A mixture of 5.0 g. of diethyl 1-cyanovinylphosphonate and 15 ml. of trimethylchlorosilane is heated in a Carius tube at 150° C. for 150° C. for 5 hours. The contents are transferred to a round-bottomed flask with ether, and the volatile material is removed under reduced pressure. The residue is stirred with 200 ml. of water at room temperature for 30 minutes. The resulting mixture is extracted with chloroform (2× 50 ml.) and ether (1× 50 ml.) and finally evaporated under reduced pressure to give 1-cyanovinyl-1-phosphonic acid.

(B) Sodium 1-bromo-1-cyano-2-hydroxyethyl-1-phosphonate.—To a solution of 2.66 g. of 1-cyanovinyl-1-phosphonic acid in 30 ml. of water is added 1.68 g. of sodium bicarbonate and 2.80 g. of N-bromoacetamide. The suspension is stirred at room temperature for 24 hours. The water is evaporated under reduced pressure. The residue is triturated with three 10 ml. portions of chloroform to remove the acetamide, and the sodium 1-bromo-1-cyano-2-hydroxyethyl-1-phosphonate is filtered and dried.

(C) Sodium 1-cyanoepoxyethyl-1-phosphonate.—To a solution of 2.52 g. of sodium 1-bromo-1-cyano-2-hydroxyethyl-1-phosphonate in 5 ml. of water is added 0.80 g. of sodium hydroxide in 2.0 ml. of water. The reaction mixture is kept at 55° C. until the pH remains constant. The pH is adjusted to 4.5, and then freeze dried to give sodium 1-cyanoepoxyethyl-1-phosphonate.

(D) Sodium 1-amino-2,3-epoxypropyl-2-phosphonate.—A solution of 1.71 g. of sodium 1-cyanoepoxyethyl-1-phosphonate in 50 ml. of methanol is hydrogenated at room temperature and atmospheric pressure in the presence of 1.0 g. of 5% palladium on carbon. After the required amount of hydrogen is taken up, the mixture is filtered through a bed of diatomaceous earth and the filtrate is evaporated under reduced pressure to give sodium 1-amino-2,3-epoxypropyl-2-phosphonate.

Example 19.—Preparation of sodium 1-phosphonotrans-1,2-epoxytridican-3-one (A) n-Tridec-1-yn-3-ol.—To a suspension of lithium acetylide [prepared from 1.5 g. (0.11 g. atom) of lithium in liquid ammonia] in 300 ml. of anhydrous ether is added dropwise 17.0 g. (0.10 mole) of hendecanal. When reaction is complete, 100 ml. of saturated aqueous ammonium chloride is added. The mixture is stirred and the layers are separated. The ether layer is washed with water, dried with anhydrous sodium sulfate, and evaporated under reduced pressure to afford the desired acetylenic alcohol, n-tridec-1-yn-3-ol.

(B) n-Tridec-1-yn-3-one.—A mixture of 9.7 g. (0.05 mole) of n-tridec-1-yn-3-ol, 200 ml. of pentane and 50 g. of activated manganese dioxide is stirred at room temperature until no alcohol remains as judged by the infrared spectrum of the pentane solution. The manganese dioxide is removed by filtration and the pentane by evaporation under reduced pressure to afford the desired acetylenic ketone, n-tridec-1-yn-3-one.

(C) Trans-1-dimethylphosphonotridec-1-en-3-one.— To 9.6 g. (0.05 mole) of n-tridec-1-yn-3-one and 5.5 g. (0.05 mole) of dimethylphosphite in 100 ml. of anhydrous ethanol cooled in an ice-bath is added dropwise dilute sodium ethoxide prepared from 0.2 g. of sodium in 50 ml. of anhydrous ethanol. Addition is made in such a way that only as much solution as is necessary for reaction is actually used. When the reaction is complete the ethanol is removed under reduced pressure. The residue is poured into 200 ml. of cold water and extracted with chloroform. The chloroform extract is washed with water, dried with anhydrous sodium sulfate and concentrated under reduced pressure to afford the desired phosphonate ester, trans-1-dimethylphosphonotridec-1-en-3-one.

(D) Trans-1-phosphonotridec-1-en-3-one.—A solution of 15.2 g. (0.05 mole) of trans-1-dimethylphosphonotridec-1-en-3-one in 100 ml. of trimethylsilyl chloride is refluxed for 18 hours. Excess reagent is removed by evaporation under reduced pressure. The residue is poured into 200 ml. of cold water and stirred vigorously. Chloroform (50 ml.) is added and the layers are separated. The aqueous phase is extracted with 50 ml. chloroform and the combined chloroform extracts are dried with sodium sulfate and concentrated to provide the desired phosphonic acid, trans-1-phosphonotridec-1-en-3-one.

(E) Sodium 1-phosphono - trans-1,2-epoxytridecan-3-one.—A solution of 2.74 g. (0.01 mole) of trans-1-phosphonotridec-1-en-3-one in ethanol is brought to pH 5 with dilute aqueous sodium hydroxide. Sodium tungstate dihydrate (0.66 g., 0.002 mole) and 1.7 ml. (0.02 mole) of 30% hydrogen peroxide are added. The mixture is heated at 50° C. until peroxide is consumed (negative starch/iodide test) and an additional 1.7 ml. of peroxide is added. Heating is continued until peroxide is consumed and the residue is lyophilized to give the desired product, sodium 1-phosphono-trans-1,2-epoxytridecan-3-one.

Example 20.—Preparation of sodium 1-phosphono-cis-1,2-epoxytridecan-3-one (A) Cis-1-dimethylphosphontridec-1-en-3-one.—A solution of 6.0 g. of trans-1-dimethylphosphonotridec-1-en-3-one prepared as described in Example 19 in 200 ml. of benzene is irradiated at 40° C. with 254 m$\mu$ light. Progress of the isomerization is followed by vapor phase chromatography of the solution. When a suitable cis/trans ratio is obtained the benzene solution is chromatographed on silica gel using benzene/chloroform and chloroform/methanol mixtures as eluants. Careful chromatography affords the cis isomer, cis-1-dimethylphosphontridec-1-en-3-one.

(B) Sodium 1-phosphono-cis - 1,2 - epoxytridecan-3-one.—Following the procedure described in Example 19D and E, cis-1-dimethyl-phosphontridec-1-en-3-one is epoxidized to obtain sodium 1-phosphono-cis-1,2-epoxytridecan-3-one.

Example 21.—Preparation of sodium 1-ethoxy-2,3-epoxypropyl-2-phosphonate (A) Diisopropyl 3-chloro-1-ethoxy-2-hydroxypropyl-2-phosphonate.—A mixture of 27 g. of 1-chloro-3-ethoxypropanone and 33 g. of diisopropylphosphite is heated under nitrogen at 60° C. for seven days. The mixture is dissolved in ether, washed with aqueous sodium chloride and dried over magnesium sulfate. Removal of the solvent under reduced pressure affords diisopropyl 3-chloro-1-ethoxy-2-hydroxypropyl-2-phosphonate.

(B) 3 - chloro-1-ethoxy-2-hydroxypropyl-2-phosphonic acid.—A solution of 10 g. of 3-chloro-1-ethoxy-2-hydroxypropyl-2-phosphonate in 80 ml. of concentrated hydrochloric acid is heated at 100° C. for 1 hour. The reaction mixture is evaporated under reduced pressure. The hydrochloric acid is removed from the residue by addition and evaporation of four 50 ml. portions of water. The residue, 3 - chloro-1-ethoxy-2-hydroxypropyl-2-phosphonic acid is dried at 60° C./0.1 mm.

(C) Sodium 1-ethoxy - 2,3 - epoxypropyl-2-phosphonate.—To a solution of 2.18 g. of 3-chloro-1-ethoxy-2-hydroxypropyl-2-phosphonic acid in 5.0 ml. of water is added a solution of 800 mg. of sodium hydroxide in 2.0 ml. of water. The reaction mixture is kept at 50° C. until the pH is constant and the 4.5 is adjusted to 4.5 with 2NHCl. The mixture is freeze dried to give sodium 1-ethoxy-2,3-epoxypropyl-2-phosphonate.

Example 22.—Preparation of sodium 1-carbamyloxy-2,3-epoxypropyl-2-phosphonate

To a mixture of 1.76 g. of sodium 1-hydroxy-2,3-epoxypropyl-2-phosphonate prepared as described in Example 9 in 10 ml. of pyridine at room temperature is added dropwise 0.80 g. of carbamyl chloride. The mixture is stirred for 24 hours at room temperature. The solvent is removed under reduced pressure to give sodium 1-carbamyloxy-2,3-epoxypropyl-2-phosphonate.

In a similar manner sodium 1-hydroxy-2,3-epoxypropyl-2-phosphonate is reacted with methylcarbamylchloride and dimethylcarbamylchloride to produce sodium N-methyl- and sodium N,N-dimethyl-1-carbamyloxy-2,3-epoxypropyl-2-phosphonate, respectively.

Example 23.—Preparation of sodium 1-ethoxycarbonyloxy-2,3-epoxypropyl-2-phosphonate To a solution of 1.76 g. of sodium 1-hydroxy-2,3-epoxypropyl-2-phosphonate and 0.84 g. of sodium bicarbonate in 10 ml. of water at 0° C. is added dropwise 1.09 g. of ethyl chloroformate. The solution is allowed to warm to room temperature and stand for 4 hours. It is then freeze dried to give sodium 1-ethoxycarbonyloxy-2,3-epoxypropyl-2-phosphonate.

Example 24.—Preparation of sodium 1-acetoxy-2,3-epoxypropyl-2-phosphonate

A mixture of 1.76 g. of sodium 1-hydroxy-2,3-epoxypropyl-2-phosphonate and 10 ml. of acetic anhydride is heated under reflux for 1 hour. The anhydride is removed under reduced pressure. The residue is dissolved in 20 ml. of water, stirred for one hour and evaporated under reduced pressure to give sodium 1-acetoxy-2,3-epoxypropyl-2-phosphonate.

Example 25.—Preparation of 1-trimethylammonium-2,3-epoxypropyl-2-phosphonate

A mixture of 1.73 g. of sodium 1-amino-2,3-epoxypropyl-2-phosphonate, 1.68 g. of sodium bicarbonate and 2.5 ml. of methyl iodide in 50 ml. of methanol is heated under reflux with stirring for 24 hours. The solids are filtered off and washed with methanol. The filtrate is evaporated under reduced pressure to obtain 1-trimethylammonium-2,3-epoxypropyl-2-phosphonate.

Example 26.—Preparation of sodium 1-dimethylamino-2,3-epoxypropyl-2-phosphonate

A solution of 1.73 g. of sodium 1-amino-2,3-epoxypropyl-2-phosphonate and 3.0 ml. of 37% aqueous formaldehyde in 60 ml. of water is hydrogenated in a Parr apparatus with 1.5 g. of 10% palladium on carbon at 25° C. and 40 p.s.i. After the required amount of hydrogen is taken up, the catalyst is filtered off and the filtrate evaporated under reduced pressure. The residue is dissolved in 20 ml. of water and evaporated under reduced pressure to give sodium 1-dimethylamino-2,3-epoxypropyl-2-phosphonate.

Example 27.—Preparation of sodium 1-methylamino-2,3-epoxypropyl-2-phosphonate

A mixture of 1.73 g. of sodium 1-amino-2,3-epoxypropyl-2-phosphonate, 1.10 g. of benzaldehyde and 10 ml. of ethanol is heated under reflux for 1 hour. Benzene (30 ml.) is added, about 20 ml. distilled off at atmospheric pressure and the remaining solvent removed under reduced pressure. The residue is heated at 100° C. for 7 hours in a Carius tube with 0.66 ml. of methyl iodide. The contents of the tube are boiled with a solution of 0.84 g. of sodium bicarbonate in 10 ml. of water for 30 minutes. The aqueous solution is extracted twice with ether and evaporated under reduced pressure to give sodium 1-methylamino-2,3-epoxypropyl-2-phosphonate.

Example 28.—Preparation of sodium 1-acetamido-2,3-epoxypropyl-2-phosphonate

A mixture of 1.73 g. of sodium 1-amino-2,3-epoxypropyl-2-phosphonate and 10 ml. of acetic anhydride are heated at 100° C. for 1 hour. The solution is evaporated under reduced pressure. The residue is dissolved in 20 ml. of water, stirred for one hour and evaporated under reduced pressure to give sodium 1-acetamido-2,3-epoxypropyl-2-phosphonate.

Example 29.—Preparation of 2-nitro-3-phosphono-3,4-epoxybutanoic acid sodium salt (A) Methyl 2-nitro-3-diisopropylphosphono-2-butenoate.—A solution of 20.8 g. (0.10 mole) of diisopropyl acetylphosphonate and 11.9 g. (0.10 mole) of methyl nitroacetate in 250 ml. of benzene containing 0.5 g. of piperidine acetate is heated at reflux in a flask fitted with a water trap. Upon completion of the reaction, as indicated by the cessation of water evolution, the reaction mixture is freed of benzene by distillation under reduced pressure to obtain the methyl 2-nitro-3-diisopropylphosphono-2-butenoate.

(B) 2 - nitro - 3 - phosphono-2-butenoic acid.—A well stirred mixture of 10.0 g. of methyl 2-nitro-3-diisopropylphosphono-2-butenoate and 80 ml. of concentrated hydrochloric acid is heated at 90° C. for one hour. Evaporation of the solution at reduced pressure affords a residue which is dissolved in 20 ml. of water and reevaporated. The solution-reevaporation process is repeated three times to remove hydrochloric acid.

The residue is dissolved in 50 ml. water, neutralized with 10% aqueous sodium hydroxide to pH 4.0 and lyophilized to afford 2-nitro-3-phosphono-2-butenoic acid as a white solid.

(C) 2-nitro-3-phosphono-3-butenoic acid sodium salt.—Irradiation of 3.5 g. of 2-nitro-3-phosphono-2-butenoic acid sodium salt in 150 ml. of methanol with a Hanovia 450 watt lamp and Vycor filter leads to a gradual decrease of the ultraviolet spectrum of the solution. Irradiation is continued until no further change occurs in the ultraviolet spectrum. Evaporation of the methanol affords the sodium salt of 2-nitro-3-phosphono-3-butenoic acid as a white solid.

(D) 2-nitro-3-phosphono-3,4-epoxybutanoic acid sodium salt.—To a solution of 2.50 g. (0.01 mole) of 2-nitro-3-phosphono-3-butenoic acid sodium salt in 15 ml. water is added 0.66 g. (0.002 mole) of sodium tungstate dihydrate and dilute sodium hydroxide to give pH 5.0. Then 0.25 ml. (0.03 mole) of 30% hydrogen peroxide is added. The solution is heated at 50° C. until peroxide is consumed (negative starch/iodide test). Another 0.25 ml. of peroxide is added and heating is continued until no peroxide remains. The solution is lyophilized to give a white residue which is triturated with methanol several times. Evaporation of the methanol extracts affords the desired sodium salt of 2-nitro-3-phosphono-3,4-epoxybutanoic acid.

Example 30.—Preparation of 2-amino-3-phosphono-3,4-epoxybutanoic acid sodium salt A solution of 3.0 g. of sodium 2-nitro-3-phosphono-3,4-epoxybutanoate prepared as described in Example 29 in 50 ml. of methanol is reduced catalytically using 100 mg. of 10% palladium on carbon. The reduction is halted when 3.0 molar equivalents of hydrogen are consumed. The catalyst is removed by filtration and the solvent by evaporation under reduced pressure to afford the 2-amino-3-phosphono-3,4-epoxybutanoic acid sodium salt as a white solid.

Example 31.—Preparation of trisodium 2-amino-3-phosphono-3,4-epoxybutanoate (A) 1,3 - dibromo-2-diisopropylphosphono-2-hydroxypropane.—A mixture of 20.4 g. (0.10 mole) of 1,1'-dibromoacetone and 16.6 g. (0.1 mole) of diisopropylphosphite is heated gradually in an oil bath. Reaction occurs at about 100–120° C. as evidenced by disappearance of diisopropylphosphite which is followed by the vapor phase chromatography. When no starting material remains heating is halted and the 1,3-dibromo-2-diisopropylphosphono-2-hydroxypropane is used in the following reaction.

(B) Diisopropyl 1-bromomethyl - 1,2 - epoxyethylphosphonate.—To a solution of 37.0 g. (0.1 mole) of 1,3-dibromo-2-diisoprophylphosphono - 2-hydroxypropane in 200 ml. of ethanol cooled to 0° C. in an ice bath is added dropwise 5.6 g. of potassium hydroxide in 100 ml. ethanol. Formation of product is followed by vapor phase chromatography. When reaction is complete the ethanol is removed under reduced pressure. The residue is taken up in 200 ml. of chloroform and extracted with 100 ml. of water. The chloroform layer is dried with sodium sulfate and evaporated under reduced pressure to afford diisopropyl 1-bromoethyl-1,2-epoxyethylphosphonate.

(C) Diisopropyl 1 - tosyloxymethyl - 1,2 - epoxyethylphosphonate.—Diisopropyl 1-bromomethyl - 1,2 - epoxyethylphosphonate (9.0 g., 0.031 mole) is added to a solution of 11.0 g. (0.039 mole) of silver tosylate in 100 ml. of acetonitrile at 0° C. to 5° C. in a flask protected from light. The mixture is allowed to come to room temperature overnight and the product is added to ice water and extracted with ethyl ether. The ether solution is dried with anhydrous sodium sulfate and concentrated under reduced pressure to afford diisopropyl 1-tosyloxymethyl-1,2-epoxyethylphosphonate.

(D) Diisopropyl 1-formyl - 1,2 - epoxyethylphosphonate.—Diisopropyl 1-tosyloxymethyl - 1,2 - epoxyethylphosphonate (15 g.) is added to a freshly prepared mixture made by adding 20 g. of sodium bicarbonate to 150 ml. of dimethyl sulfoxide through which nitrogen is bubbling and which has been heated to 150° C. (some foaming occurs). After three minutes at 150° C. the reaction mixture is cooled rapidly to room temperature. The reaction mixture is poured into 500 ml. of water and extracted with ether (3× 200 ml.). The combined ether extracts are washed with water, dried with anhydrous sodium sulfate and concentrated at reduced pressure to afford the desired diisopropyl 1-formyl-1,2-epoxyethylphosphonate.

(E) 2 - (1 - diisopropylphosphono - 1,2 - epoxyethyl) hydantoin.—A mixture of 15.4 g. (0.065 mole) of diisopropyl 1-formyl - 1,2 - epoxyethylphosphonate, 3.53 g. (0.072 mole) of sodium cyanide, 12.6 g. (0.131 mole) of ammonium carbonate, 8.7 ml. (0.131 mole) of concentrated ammonium hydroxide, 50 ml. methanol and 60 ml. of water is heated at 60° C. for three hours. All of the methanol and some water is removed under reduced pressure. The mixture is neutralized with 50% sulfuric acid to pH 4 and extracted with ether. The ether extracts are dried with anhydrous sodium sulfate and concentrated to afford the desired hydantoin.

(F) 2-amino-3-hydroxy - 2-phosphono-4-chlorobutanoic acid.—A mixture of 10.0 g. of 2-(1-diisopropylphosphono-1,2-epoxyethyl)hydantoin and 100 ml. of concentrated hydrochloric acid in a sealed thick-walled glass tube is heated at 150° C. for 24 hours. The vessel is cooled in an ice bath and the contents are concentrated under reduced pressure. The residue is dissolved in 25 ml. of water and concentrated. The solution-reevaporation procedure is repeated three times to remove hydrochloric acid. The residue is dried in vacuo to afford 2-amino-3-hydroxy-2-phosphono-4-chlorobutanoic acid (G) Trisodium 2-amino-3-phosphono-3,4-epoxybutanoate.—A solution of 7.0 g. of 2-amino-3-hydroxy-2-phosphono-4-chlorobutanoic acid in 50 ml. of water is brought to pH 8 with aqueous sodium hydroxide. The pH is kept at 8–9 by adding increments of aqueous sodium hydroxide. When no further change in pH occurs, the solution is lyophilized to afford trisodium 2-amino-3-phosphono-3,4-epoxybutanoate.

Example 32.—Preparation of 1-phosphono-1,2-epoxy-1-sulfonic acid trisodium salt (A) Ethyl 1-diisopropylphosphonovinyl-1-sulfonate.—A solution of 28.8 g. (0.10 mole) of ethyl diisopropylphosphonomethanesulfonate and 3.0 g. (0.10 mole) of paraformaldehyde in 250 ml. of benzene containing 0.5 g.

of piperidine acetate is heated at reflux in a flask fitted with a water trap. Upon completion of the reaction, as indicated by the cessation of water evolution, the reaction mixture is freed of benzene by distillation under reduced pressure to obtain the ethyl 1-diisopropylphosphonovinyl-1-sulfonate.

(B) 1 - phosphonovinyl - 1 - sulfonic acid.—A well-stirred mixture of 2.0 g. of ethyl 1-diisopropylphosphonovinyl-1-sulfonate and 15 ml. of concentrated hydrochloric acid is heated at 100° C. for one hour. Evaporation of the solution under reduced pressure affords a residue which is taken up in 10 ml. of water and reevaporated. The solution-evaporation procedure is repeated three times to remove hydrochloric acid. The viscous residue is dried in vacuo to afford the 1-phosphonovinyl-1-sulfonic acid.

(C) 1 - phosphono - 1,2 - epoxyethyl - 1 - sulfonic acid trisodium salt.—A solution of 3.52 g. (0.02 mole) of 1-phosphonovinyl-1-sulfonic acid in 25 ml. of water is titrated to pH 5 with dilute aqueous sodium hydroxide. Sodium tungstate dihydrate (0.66 g., 0.0002 mole) and 2.6 ml. (0.03 mole) of 30% hydrogen peroxide are added and the solution is heated at 50° C. until peroxide is consumed (negative starch/iodide test). Additional hydrogen peroxide (2.6 ml.) is added and heating continued until a negative starch/iodide test is obtained. The solution is lyophilized to afford the 1-phosphono-1,2-epoxyethyl-1-sulfonic acid trisodium salt.

Example 33.—Preparation of 1-disodiumphosphono-1,2-epoxyethyl-1-sulfonamide (A) 1 - diisopropylphosphonovinyl - 1 - sulfonic acid.—A mixture of 15.0 g. (0.05 mole) of ethyl 1-diisopropylphosphonovinyl sulfonate prepared as described in Example 32 and 100 ml. of water containing a drop of concentrated hydrochloric acid is stirred for several hours at room temperature. The water is removed in vacuo and the residue is dried over sulfuric acid in a desiccator to afford 1-dissopropylphophonovinyl-1-sulfonic acid.

(B) 1 - diisopropylphosphonovinyl - 1 - sulfonyl chloride.—1 - diisopropylphosphonovinyl - 1 - sulfonic acid (8.2 g., 0.03 mole) in 25 ml. of thionyl chloride is refluxed gently until hydrogen chloride evolution ceases. Evaporation of the excess thionyl chloride affords the desired sulfonyl chloride.

(C) 1 - phosphonovinyl - 1 - sulfonyl chloride.—A well-stirred mixture of 2.9 g. (0.01 mole) of 1-diisopropylphosphonovinyl-1-sulfonyl chloride and 25 ml. of concentrated hydrochloric acid is heated at 100° C. for one hour. Evaporation of the solution affords a residue which is dissolved in 10 ml. of water and reevaporated. The solution-evaporation procedure is repeated three times to remove hydrochloric acid. Drying of the residue in vacuo provides the desired sulfonyl chloride.

(D) 1 - diammoniumphosphonovinyl - 1 - sulfonamide.—A well-stirred suspension of 4.1 g. (0.02 mole) of 1-phosphonovinyl-1-sulfonyl chloride in 150 ml. of dry tetrahydrofuran is cooled to −30° C. and anhydrous ammonia is bubbled in slowly until the mixture contains excess ammonia. The mixture is purged with dry nitrogen to remove most of the excess ammonia and evaporated under reduced pressure to dryness. The residue is triturated with ethanol and filtered. The desired product is obtained by evaporation of the ethanol to afford the 1-diammoniumphosphonovinyl-1-sulfonamide.

(E) 1 - disodiumphosphono - 1,2 - epoxyethyl - 1 - sulfonamide.—A solution of 4.4 g. (0.02 mole) of 1-diammoniumphosphonovinyl - 1 - sulfonamide in 20 ml. of water is adjusted to pH 8 with dilute aqueous sodium hydroxide. To the solution is added 1.7 ml. (0.02 mole) of 30% hydrogen peroxide. The pH of the solution is maintained at 8-9 by continuous addition of dilute aqueous sodium hydroxide. When the peroxide is consumed (negative starch/iodide test) the solution is lyophilized to afford the desired epoxide, 1-disodiumphosphono-1,2-epoxyethyl-1-sulfonamide.

Example 34.—Preparation of 1-amidinoepoxyethyl-1-phosphonic acid

To a solution of 1.71 g. of sodium 1-cyanoepoxy-ethyl-1-phosphonate prepared as described in Example 18 in 10 ml. of anhydrous methanol is added 0.054 g. of sodium methoxide, and the mixture is stirred at room temperature for 24 hours. Then 0.59 g. of ammonium chloride is added, and the mixture stirred until the salt dissolved. The solvent is removed under reduced pressure to give 1-amidinoepoxyethyl-1-phosphonic acid.

The N-methyl- and the N,N-dimethyl-1-amidinoepoxyethyl-1-phosphonic acids are prepared as above except that methylamine hydrochloride and dimethylamine hydrochloride, respectively, are substituted in place of ammonium chloride.

Example 35.—Preparation of 1-guanidino-2,3-epoxypropyl-2-phosphonic acid

To a solution of 1.73 g. of sodium 1-amino-2,3-epoxypropyl-2-phosphonate prepared as described in Example 18 and 1.11 g. of O-methylisouronium chloride in 10 ml. of water is added 5.0 ml. of 2.0 N sodium hydroxide. The mixture is allowed to stand at room temperature for 5 days. The pH is adjusted to 5 with 2 N hydrochloric acid, and the mixture is evaporated under reduced pressure to give 1-guanidino-2,3-epoxypropyl-2-phosphonic acid.

Example 36.—Preparation of sodium N-carboethoxy-1-amino-2,3-epoxypropyl-2-phosphonate To a solution of 1.73 g. of sodium 1-amino-2,3-epoxypropyl-2-phosphonate and 0.84 g. of sodium bicarbonate in 10 ml. of water at 0° C. is added dropwise 1.08 g. of ethyl chloroformate. The mixture is allowed to warm to room temperature, and after 2 hours it is freeze-dried to give sodium N-carboethoxy-1-amino-2,3-epoxypropyl-2-phosphonate.

Example 37.—Preparation of sodium 1-ureido-2,3-epoxypropyl-2-phosphonate

To a mixture of 1.73 g. of sodium 1 - amino - 2,3-epoxypropyl - 2 - phosphonate in 10 ml. of pyridine at room temperature is added dropwise 0.80 g. of carbamyl chloride. The mixture is stirred at room temperature for 2 hours. The solvent is then removed under reduced pressure to give sodium 1 - ureido - 2,3 - epoxypropyl - 2 - phosphonate.

In a similar manner sodium 1 - amino - 2,3 - epoxypropyl - 2 - phosphonate is reacted with methylcarbamyl chloride and dimethylcarbamyl chloride to give sodium N - methyl - 1 - ureido - 2,3 - epoxypropyl - 2 - phosphonate and N,N - dimethyl - 1 - ureido - 2,3 - epoxypropyl-2-phosphonate, respectively.

Example 38.—Preparation of sodium N-sulfamoyl-1-amino-2,3-epoxypropyl-2-phosphonate To a mixture of 1.73 g. of sodium 1 - amino - 2,3-epoxypropyl - 2 - phosphonate in 10 ml. of pyridine at room temperature is added dropwise 1.16 g. of sulfamoyl chloride. The mixture is stirred at room temperature for 5 hours. The solvent is then removed under reduced pressure to give sodium N - sulfamoyl - 1 - amino - 2,3-epoxypropyl - 2 - phosphonate.

In a similar manner sodium 1 - amino - 2,3 - epoxypropyl - 2 - phosphonate is reacted with methylsulfamoyl chloride and dimethylsulfamoyl chloride to give sodium N' - methyl - N - sulfamoyl- and sodium N',N' - dimethyl-N - sulfamoyl - 1 - amino 2,3 - epoxypropyl - 2 - phosphonate, respectively.

Example 39.—Preparation of sodium cis- and trans-2-carboxamidoepoxyethyl-1-phosphonate (A) Diethyl cis- and trans - 2 - cyanovinyl - 1 - phosphonate.—The mixture of diethyl cis- and trans-2-cyanovinyl - 1 - phosphonate in the crude, undistilled product from the reaction of 2-bromoacrylonitrile and triethylphosphite is separated to give the pure cis and trans isomers diethyl 2 - cyanovinyl - 1 - phosphonate by chromatography on silica gel with methanol-chloroform as eluent.

(B) Cis- and trans - 2 - cyanovinyl - 1 - phosphonic acid.—A mixture of 5.0 g. of diethyl trans - 2 - cyanovinyl - 1 - phosphonate and 15 ml. of trimethylchlorosilane is heated in a Carius tube at 130° C. for 5 hours. The contents are transferred to a round-bottomed flask with ether, and the volatile material is removed under reduced pressure. The residue is stirred with 200 ml. of water at room temperature for 30 minutes. The mixture is extracted with chloroform (2× 50 ml.) and ether (1× 50 ml.) and the extracts evaporated under reduced pressure to give trans-2-cyanovinyl-1-phosphonic acid.

In the same way diethyl cis - 2 - cyanovinyl - 1 - phosphonate affords cis-2-cyanovinyl-1-phosphonic acid.

(C) Sodium cis- and trans - 2 - carboxamidoepoxyethyl - 1 - phosphonate.—To a solution of 1.33 g. of trans-2 - cyanovinyl - 1 - phosphonic acid 0.84 g. of sodium bicarbonate and 0.165 g. of sodium tungstate dihydrate in 10 ml. of water is added 1.23 ml. of 30% aqueous hydrogen peroxide. The mixture is heated at 55° C. for 5 hours and then freeze-dried. The residue is triturated with three 15 ml. portions of methanol. Evaporation of the methanol under reduced pressure gives sodium trans-2-carboxamidoepoxyethyl-1-phosphonate.

In the same manner cis - 2 - cyanovinyl - 1 - phosphonic acid is epoxidized to give sodium cis - 2 - carboxamidoepoxyethyl-1-phosphonate.

Example 40.—Preparation of sodium cis- and trans-2-cyanoepoxyethyl-1-phosphonate To a mixture of 1.89 g. of sodium trans-2-carboxamidoepoxyethyl - 1 - phosphonate in 10 ml. of pyridine cooled to 5° C. is added 1.91 g. of p-toluenesulfonyl chloride and the mixture is kept at 5° C. for 20 hours. The solid is filtered off and the filtrate evaporated under reduced pressure to give sodium trans-2-cyanoepoxyethyl-1-phosphonate.

In an analogous manner sodium cis-2-carboxamidoepoxyethyl - 1 - phosphonate is dehydrated to sodium cis-2-cyanoepoxyethyl-1-phosphonate.

Example 41.—Preparation of sodium cis- and trans-3-amino-1,2-epoxypropyl-1-phosphonate A solution of 1.71 g. of sodium trans - 2 - cyanoepoxyethyl - 1 - phosphonate in 50 ml. of methanol is hydrogenated at room temperature and atmospheric pressure in the presence of 1.0 g. of 5% palladium on carbon. After the required amount of hydrogen is taken up, the catalyst is filtered off and the filtrate evaporated under reduced pressure to give sodium trans - 3 - amino - 1,2-epoxypropyl-1-phosphonate.

In the same way sodium cis - 2 - cyanoepoxyethyl-1-phosphonate is hydrogenated to obtain sodium cis - 3-amino-1,2-epoxypropyl-1-phosphonate.

Example 42.—Preparation of cis- and trans-2-amididino-epoxyethyl-1-phosphonic acid To a solution of 1.71 g. of sodium trans-2-cyanoepoxyethyl - 1 - phosphonate prepared as described in Example 40 in 10 ml. of anhydrous methanol is added 0.054 g. of sodium methoxide, and the mixture is stirred at room temperature for 24 hours. Then 0.59 g. of ammonium chloride is added, and the mixture is stirred at room temperature for 6 hours. The solvent is removed under reduced pressure to give trans - 2 - amidinoepoxyethyl-1-phosphonic acid.

The trans - N - methyl- and the trans - N,N, - dimethyl-2 - amidinoepoxeythyl - 1 - phosphonic acids are prepared as above except that methylamine hydrochloride and dimethylamine hydrochloride, respectively, are substituted for ammonium chloride.

In a similar manner sodium cis - 2 - cyanoepoxyethyl-1 - phosphonate is reacted with ammonium chloride, methylamine hydrochloride and dimethylamine hydrochloride to give cis - 2 - amidino-, cis - N - methyl - 2-amidino- and cis - N,N - dimethyl - 2 - amidinoepoxyethyl-1-phosphonic acids, respectively.

Example 43.—Preparation of trans-1,2-epoxy-3-guanidinopropyl-1-phosphonic acid To a solution of 1.75 g. of sodium trans-3-amino-1,2-epoxypropyl - 1 - phosphonate prepared as described in Example 41 and 1.11 g. of o-methylisouronium chloride in 10 ml. of water is added 5.0 ml. of 2.0 N sodium hydroxide. The mixture is allowed to stand at room temperature for 5 days. The pH is then adjusted to 5 with 2 N hydrochloric acid and the mixture evaporated under reduced pressure to give trans - 1,2 - epoxy-3-guanidinopropyl-1-phosphonic acid.

In the same manner sodium cis-3-amino-1,2-epoxypropyl - 1 - phosphonate affords cis - 1,2 - epoxy - 3-guanidinopropyl - 1 - phosphonic acid.

Example 44.—Preparation of sodium trans-N-carboethoxy-3-amino-1,2-epoxypropyl-1-phosphonate To a solution of 1.75 g. of sodium trans - 3 - amino-1,2 - epoxypropyl - 1 - phosphonate and 0.84 g. of sodium bicarbonate in 10 ml. of water at 0° C. is added dropwise 1.08 g. of ethyl chloroformate. The mixture is allower to warm to room temperature, and after 2 hours it is freeze-dried to give sodium trans-N-carboethoxy - 3-amino-1,2-epoxypropyl-1-phosphonate.

In the same manner sodium cis - 3 - amino-1,2-epoxypropyl - 1 - phosphonate gives sodium cis-N-carboethoxy-3-amino-1,2-epoxypropyl-1-phosphonate.

Example 45.—Preparation of sodium trans-3-ureido-1,2-epoxypropyl-1-phosphonate To a mixture of 1.75 g. of sodium trans - 3 - amino-1,2 - epoxypropyl - 1 - phosphonate in 10 ml. of pyridine is added dropwise at room temperature 0.80 g. of carbamyl chloride. The mixture is stirred at room temperature for 2 hours. The solvent is removed at reduced pressure to give sodium trans-3-ureido-1,2-epoxypropyl-1-phosphonate.

In the same way sodium trans-3-amino - 1,2 - epoxypropyl - 1 - phosphonate is reacted with methylcarbamyl chloride and dimethylcarbamyl chloride to give sodium trans-N-methyl - 3 - ureido- and sodium trans-N,N-dimethyl - 3 - ureido - 1,2 - epoxypropyl - 1 - phosphonate, respectively.

Similarly, sodium cis - 3 - amino - 1,2 - epoxypropyl-1-phosphonate is reacted with carbamyl chloride, methylcarbamylchloride and dimethylcarbamyl chloride to give sodium cis-3-ureido-, sodium cis-N-methyl-3-ureido- and sodium cis - N,N - dimethyl - 3 - ureido - 1,2 - epoxypropyl - 1 - phosphonate, respectively.

Example 46.—Preparation of sodium trans-N-sulfamoyl-3-amino-1,2-epoxypropyl-1-phosphonate To a mixture of 1.75 g. of sodium trans-3-amino-1,2-epoxypropyl-1-phosphonate in 10 ml. of pyridine at room temperature is added dropwise 1.16 g. of sulfamoyl chloride. The mixture is stirred at room temperature for 5 hours. The solvent is then removed under reduced pressure to give sodium trans-N-sulfamoyl-3-amino-1,2-epoxypropyl-1-phosphonate.

In the same way sodium trans-3-amino - 1,2 - epoxypropyl - 1 - phosphonate is reacted with methylsulfamoyl chloride and dimethylsulfamoyl chloride to give sodium trans - N - methylsulfamoyl - 3 - amino- and sodium trans - N,N - dimethylsulfamoyl - 3 - amino - 1,2 - epoxypropyl-1-phosphonate, respectively.

Similarly, sodium cis-3-amino - 1,2 - epoxypropyl-1-phosphonate is reacted with sulfamoyl chloride, methylsulfamoyl chloride and dimethylsulfamoyl chloride to give sodium cis-N-sulfamoyl - 3 - amino-, sodium cis-N-methylsulfamoyl - 3 - amino- and sodium cis-N,N-dimethylsulfamoyl - 3 - amino - 1,2 - epoxypropyl-1-phosphonate, respectively.

Example 47.—Preparation of sodium trans-3-acetamido-1,2-epoxypropyl-1-phosphonate A mixture of 1.75 g. of sodium trans-3-amino-1,2-epoxypropyl-1-phosphonate and 10 ml. of acetic anhydride is heated at 100° C. for 1 hour. The solution is evaporated under reduced pressure. The residue is dissolved in 20 ml. of water and evaporated under reduced pressure to give sodium trans-3-acetamido-1,2-epoxypropyl-1-phosphonate.

Similarly, sodium cis-3-amino-1,2-epoxypropyl-1-phosphonate is acetylated to give sodium cis-3-acetamido-1,2-epoxypropyl-1-phosphonate.

Example 48.—Preparation of sodium trans-3-methylamino-1,2-epoxypropyl-1-phosphonate A mixture of 1.75 g. of sodium trans-3-amino-1,2-epoxypropyl-1-phosphonate, 1.10 g. of benzaldehyde and 10 ml. of ethanol is heated under reflux for 1 hour. Benzene (30 ml.) is added, about 20 ml. distilled at atmospheric pressure and the remaining solvent removed under reduced pressure. The residue is heated at 100° C. for 7 hours in a Carius tube with 0.66 ml. of methyl iodide. The contents of the tube are boiled with a solution of 0.84 g. of sodium bicarbonate in 10 ml. of water for 30 minutes. The aqueous mixture is extracted twice with ether and evaporated under reduced pressure to give sodium trans-3-methylamino-1,2-epoxypropyl-1-phosphonate.

Similarly, sodium cis-3-amino-1,2-epoxypropyl-1-phosphonate gives sodium cis-3-methylamino-1,2-epoxypropyl-1-phosphonate.

Example 49.—Preparation of sodium trans-3-dimethylamino-1,2-epoxypropyl-1-phosphonate A solution of 1.75 g. of sodium trans-3-amino-1,2-epoxypropyl-1-phosphonate and 3.0 ml. of 37% aqueous formaldehyde in 60 ml. of water is hydrogenated in a Parr apparatus with 1.5 g. of 10% palladium on carbon at 25° C. and 40 p.s.i. After the required amount of hydrogen is taken up, the catalyst is filtered off and the filtrate evaporated under reduced pressure. The residue is dissolved in 20 ml. of water and evaporated under reduced pressure to give sodium trans-3-dimethylamino-1,2-epoxypropyl-1-phosphonate.

Similarly, sodium cis-3-amino-1,2-epoxypropyl-1-phosphonate gives sodium cis-3-dimethylamino-1,2-epoxypropyl-1-phosphonate.

Example 50.—Preparation of trans-3-trimethylammonium-1,2-epoxypropyl-1-phosphonate A mixture of 1.75 g. of sodium trans-3-amino-1,2-epoxypropyl-1-phosphonate, 1.68 g. of sodium bicarbonate and 2.5 ml. of methyl iodide in 50 ml. of methanol is heated under reflux with stirring for 24 hours. The solids are filtered from the cooled reaction mixture and washed with methanol. The filtrate and washings are evaporated under reduced pressure to give trans-3-trimethylammonium-1,2-epoxypropyl-1-phosphonate.

Similarly, sodium cis-3-amino-1,2-epoxypropyl-1-phosphonate gives cis-3-trimethylammonium-1,2-epoxypropyl-1-phosphonate.

Example 51.—Preparation of disodium 2,3-epoxy-1-ethylthiopropyl-2-phosphonate (A) 1-chloro-3-ethylthiopropanone.—To a solution of 2.3 g. of sodium in 40 ml. of methanol is added at room temperature a solution of 7.0 g. of ethyl mercaptan in 20 ml. of methanol. Then 25.4 g. of 1,3-dichloroacetone is added and the mixture heated under reflux for 4 hours. Most of the methanol is removed under reduced pressure, the residue poured into 200 ml. of water and extracted with ether (3× 100 ml.). The combined ether extracts are washed with 1 N sodium hydroxide (1× 50 ml.), water (1× 100 ml.) and saturated sodium chloride solution (1× 100 ml.) and dried over magnesium sulfate. Removal of the ether under reduced pressure gives 1-chloro-3-ethylthiopropanone.

(B) Diisopropyl 3-chloro-1-ethylthio-2-hydroxypropyl-2-phosphonate.—A mixture of 30.5 g. of 1-chloro-3-ethylthio-propanone and 33 g. of diisopropylphosphite is heated under nitrogen at 60° C. for six days. The mixture is dissolved in ether, washed with aqueous sodium chloride and dried over magnesium sulfate. Removal of the solvent under reduced pressure gives diisopropyl 3-chloro-1-ethylthio-2-hydroxypropyl-2-phosphonate.

(C) 3-chloro-1-ethylthio-2-hydroxypropyl-2-phosphonic acid.—A solution of 10 g. of diisopropyl 3-chloro-1-ethylthio-2-hydroxypropyl - 2 - phosphonate in 80 ml. of concentrated hydrochloric acid is heated at 100° C. for 1 hour. The reaction mixture is evaporated under reduced pressure. The hydrochloric acid is removed from the residue by addition and evaporation of four 50 ml. portions of water. The residue, 3-chloro-1-ethylthio-2-hydroxypropyl-2-phosphonic acid, is dried at 60° C./0.1 mm.

(D) Disodium 2,3-epoxy-1-ethylthiopropyl-2-phosphonate.—To a solution of 2.04 g. of 3-chloro-1-ethylthio-2-hydroxypropyl-2-phosphonic acid in 7 ml. of water is added a solution of 800 mg. of sodium hydroxide in 3.0 ml. of water. The pH of the mixture is maintained above 9 by addition of 1 N sodium hydroxide. When there is no further change in the pH, the mixture is freeze-dried to give disodium 2,3-epoxy-1-ethylthiopropyl-2-phosphonate.

Example 52.—Preparation of sodium 2,3-epoxy-1-mercaptopropyl-2-phosphonate

Hydrogen sulfide is bubbled into a solution of 1.20 g. of sodium sulfide nonahydrate in 7 ml. of water until it is acid to phenolphthalein. The pH of a solution of 2.61 g. of disodium 1-bromo - 2,3 - epoxypropyl-2-phosphonate prepared following the procedure described in Example 12 starting with 1,1'-dibromoacetone in 7 ml. of water is adjusted to 4.5 with 1 N hydrochloric acid. The two solutions are combined and heated under reflux for 4 hours. The reaction mixture is freeze-dried to afford sodium 2,3-epoxy-1-mercaptopropyl-2-phosphonate.

Example 53.—Preparation of 1-amino-trans-2,3-epoxy-4-sodiumphosphonobutyric acid (A) 2-amino - 4 - sodiumphosphono-trans-3-butenenitrile.—A solution of 15.8 g. (0.10 mole) of sodium trans-2-formylvinylphosphonate, 5.4 g. (0.11 mole) of sodium cyanide, 5.9 g. (0.11 mole) of ammonium chloride and 100 ml. of water is heated at 60° C. for about 6 hours. The water is removed by evaporation under reduced pressure to afford the desired aminonitrile.

(B) 2-amino - 4 - sodiumphosphono-trans-3-butenoic acid.—A solution of 18.4 g. (0.10 mole) of 2-amino-4-sodiumphosphono-trans-3-butenenitrile in 100 ml. of concentrated hydrochloric acid is refluxed for about 5 hours. The solution is evaporated under reduced pressure to remove hydrochloric acid. Water (50 ml.) is added and the solution is reevaporated. The solution-evaporation procedure is repeated three times to remove hydrochloric acid. The residue is triturated with ethanol dried in vacuo to afford the desired amino acid.

(C) 1 - amino-trans-2,3-epoxy - 4 - sodiumphosphonobutyric acid.—A solution of 3.62 g. (0.02 mole) of 2-amino - 4 - sodiumphosphono-trans-3-butenoic acid in 25 ml. of water is brought to pH 5.5 with aqueous sodium hydroxide. Sodium tungstate dihydrate (0.66 g., 0.002 mole) and 2.6 ml. (0.03 mole) of 30% hydrogen peroxide are added. The solution is heated to 50° C. and maintained there until almost all peroxide is consumed. Excess peroxide is destroyed by dropwise addition of aqueous sodium sulfite (negative starch/iodide test). Lyophilization affords the desired epoxyamino acid, 1-amino-trans-2,3-epoxy-4-sodiumphosphonobutyric acid.

Sodium cis-2-formylvinylphosphonate can be converted to 1-amino-cis-2,3-epoxy-4-sodiumphosphonobutyric acid following the procedures described above.

Example 54.—Preparation of sodium 1,2-epoxy-2-trans-dichloromethylethylphosphonate (A) Sodium 3,3 - dichloro - trans-1-propenylphosphonate.—A mixture of 15.8 g. (0.10 mole) of sodium trans-2-formylvinylphosphonate, 33.3 g. (0.10 mole) of triphenylphosphine dichloride and 150 ml. of dimethylformamide is gradually heated to reflux. After several hours at reflux volatile material and dimethylformamide are remove under reduced pressure. The residue is distributed between 100 ml. of water and 100 ml. of chloroform. Lyophilization of the aqueous layer affords the desired dichlorophosphonate.

In an analogous manner, sodium 3,3-dichloro-cis-1-propenylphosphonate may be obtained from sodium cis-2-formylvinylphosphonate.

(B) Sodium 1,2 - epoxy - 2-trans-dichloromethylethylphosphonate.—A solution of 4.26 g. (0.02 mole) of sodium 3,3-dichloro-trans-1-propenylphosphonate in 25 ml. of water is neutralized to pH 5.5 with aqueous sodium hydroxide. Sodium tungstate dihydrate (0.66 g., 0.002 mole) and 2.6 ml. (0.03 mole) of 30% hydrogen peroxide are added. The mixture is warmed to 50° C. and maintained there until peroxide is consumed (negative starch/iodide test). Lyophilization affords the desired epoxyphosphonate.

In an analogous manner, sodium 3,3-dichloro-cis-1-propenylphosphonate is epoxidized to sodium 1,2-epoxy-2-cis-dichloromethylethylphosphonate.

In an analogous manner, sodium cis- and sodium trans-2-formylvinylphosphonate can be converted to the corresponding sodium 3,3-dibromo-cis- and sodium 3,3-dibromo-trans-1-propenylphosphonate using triphenylphosphinedibromide. Epoxidation as described above affords the corresonding sodium 1,2-epoxy-2-trans- and sodium 1,2-epoxy-2-cis-dichloromethylethylphosphonate.

Example 55.—Preparation of sodium trans-1,2-epoxy-3-bromopropylphosphonate (A) Sodium 3-bromo-trans-1-propenylphosphonate.—Sodium 3-hydroxy-trans-1-propenylphosphonate (16.0 g., 0.10 mole) is mixed with 26.2 g. (0.10 mole) of dry distilled triphenylphosphine in 100 ml. of dry dimethylformamide in a nitrogen atmosphere. Bromine (18.0 g., 0.10 mole) is added dropwise in such a manner that a large excess does not accumulate. The reaction mixture is heated to increase rate of bromine consumption. When reaction is complete, the mixture is distilled under reduced pressure to remove volatiles and dimethylformamide. The residue is distributed between 100 ml. of chloroform and 100 ml. of water. The aqueous solution is adjusted to pH 5 and lyophilized to afford the desired bromo-propenylphosphonate.

In an analogous manner, sodium 3 - chloro - trans - 1-propenylphosphonate is prepared from triphenylphosphine dichloride.

(B) Sodium trans - 1,2 - epoxy-3-bromopropylphosphonate.—A solution of 4.46 g. (0.02 mole) of sodium 3-bromo-trans-1-propenylphosphonate in 20 ml. of water is adjusted to pH 5.5 with aqueous sodium hydroxide. Sodium tungstate dihydrate (0.66 g., 0.002 mole) and 2.6 ml. (0.03 mole) of 30% hydrogen peroxide are added. The temperature is increased to 50° C. and maintained there until peroxide is consumed (negative starch/iodide test). The solution is lyophilized to afford the desired epoxide.

In an analogous manner, the corresponding 3-chloro-, 3-fluoro-, and 3-iodo-trans-1-propenylphosphonates are oxidized to the corresponding epoxides.

Example 56.—Preparation of sodium trans-1,2-epoxy-3-fluoropropylphosphonate

A solution of sodium 3-bromo-trans-1-propenylphosphonate (22.3 g., 0.01 mole) in 100 ml. of water containing 12.6 g. (0.3 mole) of sodium fluoride is heated on a steam bath for about 8 hours. Lyophilization affords the crude desired fluorophosphonate. Oxidation of the propenyl compound following the procedures described in Example 54 affords the sodium trans-1,2-epoxy-3-fluoropropylphosphonate.

In an analogous manner, sodium 3-chloro- and sodium 3-iodo-trans-1-propenylphosphonate are prepared from sodium 3-bromo-trans-1-propenylphosphonate and sodium chloride and sodium iodide, respectively.

Beginning with sodium trans-1,2-epoxy-3-bromo-propylphosphonate, the corresponding 3-fluoro, 3-chloro and 3-iodo epoxides can also be obtained in an analogous manner by reaction with sodium fluoride, sodium chloride or sodium iodide.

When sodium 3-hydroxy-cis-1-propenylphosphonate is substituted for the trans isomer in the above procedures, the products resulting are the corresponding cis isomers.

Example 57.—Preparation of sodium cis-1,2-epoxy-3-phenylpropylphosphonate (A) Diethyl 3 - phenyl-cis-1-propenylphosphonate.—A solution of 10.0 g. of diethyl 3-phenyl-trans-1-propenylphosphonate in 150 ml. of benzene is irradiated with ultraviolet light. Progress of the isomerization is followed by vapor phase chromatography. When a suitable cis/trans ratio is obtained, the solution is chromatographed on silica gel using benzene/chloroform and chloroform/methanol mixtures as eluant. Careful chromatography affords the cis isomer.

(B) Sodium 3-phenyl-cis - 1 - propenylphosphonate.—A mixture of 12.7 g. (0.05 mole) of diethyl 3-phenyl-cis-1-propenylphosphonate, 5.0 g. (0.05 mole) of triethylamine and 108.5 g. (1.0 mole) of chlorotrimethylsilane is heated in a sealed tube for 3 hours at 130° C. Excess silane is removed by evaporation under reduced pressure, and the residue is slurried with benzene and filtered. The filtrate is evaporated under reduced pressure and the residue is poured into 100 ml. of water and stirred well. Solid sodium bicarbonate is added at intervals to keep the liberated acid in solution. After one hour the solution is extracted with chloroform and the aqueous phase is acidified to pH 4 and evaporated. The white residue contains the desired cis acid salt.

(C) Sodium cis-1,2-epoxy - 3 - phenylpropylphosphonate.—A solution of 4.40 g. (0.02 mole) of sodium 3-phenyl-cis-1-propenylphosphonate in 20 ml. of water is brought to pH 5.5 with aqueous sodium hydroxide. Sodium tungstate dihydrate (0.66 g., 0.002 mole) and 2.6 ml. (0.03 mole) of 30% hydrogen peroxide are added. After 6 hours at room temperature excess peroxide is destroyed by dropwise addition of aqueous sodium sulfite (negative starch/iodide test). The solution is lyophilized to afford the desired epoxide.

Example 58.—Preparation of sodium 1,2-epoxy-3-phenyl-propyl-2-phosphonate (A) Dibenzyl 1-phenyl-2-hydroxy - 3 - chloropropyl-2-phosphonate.—A solution of 16.9 g. (0.10 mole) of 1-chloro-3-phenyl-2-propanone and 26.2 g. (0.10 mole) of dibenzyl phosphite is heated at 120° C. Progress of the reaction is followed by vapor phase chromatography of the reaction mixture. When reaction is complete, the solution containing dibenzyl 1-phenyl-2-hydroxy - 3 - chloropropyl-2-phosphonate is cooled and used in the next reaction.

(B) Dibenzyl 1,2-epoxy-3-phenylpropyl - 2 - phosphonate.—A well-stirred solution of 43 g. (0.10 mole) of dibenzyl 1-phenyl-2-hydroxy-3-chloropropyl-2 - phosphonate in 200 ml. of ethanol is cooled to about 0° C. and 5.6 g. (0.10 mole) of potassium hydroxide in 50 ml. of ethanol is added dropwise. The mixture is warmed to room temperature and stirred until precipitation is complete. The mixture is evaporated under reduced pressure to remove ethanol and the residue is washed well with water. The remaining oil is dried with anhydrous sodium sulfate to afford the desired epoxide dibenzyl ester.

(C) Sodium 1,2 - epoxy-3-phenylpropyl - 2 - phosphonate.—A solution of 3.94 g. (0.01 mole) of dibenzyl 1,2-epoxy-3-phenylpropyl-2-phosphonate in 25 ml. of methanol is catalytically hydrogenated at room temperature and atmospheric pressure using 200 mg. of 10% palladium on carbon. The reaction is halted when 2.0 molar equivalents of hydrogen are consumed. The reaction mixture is neutralized to pH 5 with aqueous sodium hydroxide and filtered to remove catalyst. The filtrate is evaporated under reduced pressure to afford the desired epoxide salt.

Example 59.—Preparation of cis- and trans-1,2-di-(sodiumphosphono)oxirane (A) Trans-1,2 - di(diisopropylphosphono)ethylene.—To 19.0 g. (0.10 mole) of diisopropylethynylphosphonate in 150 ml. of benzene is added dropwise 11.9 g. (0.10 mole) of diisopropyl phosphite containing 0.23 g. of dissolved sodium. After addition is complete, the mixture is heated. Progress of the reaction is followed by observing the disappearance of starting acetylene by vapor phase chromatography. When reaction is complete, the solution is extracted with 50 ml. of water, dried with sodium sulfate and evaporated under reduced pressure to remove benzene. Distillation of the residue under reduced pressure affords the desired diphosphonate, trans-1,2-di-(diisopropylphosphono)ethylene.

(B) Cis - 1,2 - di(diisopropylphosphono)ethylene.—A solution of 10.0 g. of trans-1,2-di(diisopropylphosphono) ethylene in 150 ml. of benzene is irradiated with ultraviolet light. Progress of the isomerization is followed by vapor phase chromatography. When a suitable cis/trans ratio is obtained, the solution is chromatographed on silica gel using benzene/chloroform and chloroform/methanol mixtures as eluants. Careful chromatography affords the desired cis isomer.

(C) Trans-1,2 - diphosphonoethylene.—A well-stirred mixture of 4.0 g. of trans-1,2-di(diisopropylphosphono) ethylene in 60 ml. of concentrated hydrochloric acid is heated in an oil bath maintained at 100° C. for one hour. Evaporation under reduced pressure affords a residue which is dissolved in 10 ml. of water and reevaporated. This solution-evaporation procedure is repeated three times to remove hydrochloric acid. The residue is dried in vacuo to afford the desired diphosphonic acid.

In an analogous manner, cis-1,2-di(diisopropylphosphono)ethylene is converted to cis-1,2-diphosphonoethylene.

(D) Trans - 1,2 - di(sodiumphosphono)oxirane.—A solution of 3.76 g. (0.02 mole) of trans-1,2-diphosphonoethylene in 20 ml. of water is adjusted to pH 5.5 with aqueous with sodium hydroxide. Sodium tungstate dihydrate (0.66 g., 0.002 mole) and 1.7 ml. (0.02 mole) of 30% hydrogen peroxide are added. The soltuion is heated to 50° C. and maintained there until peroxide is consumed (negative starch/iodide test). Another 1.7 ml. of 30% hydrogen peroxide is added and heating continued until peroxide is consumed. The solution is lyophilized to afford the desired epoxide.

In the same manner, cis-1,2-diphosphonoethylene is converted to cis-1,2-di(sodiumphosphono)oxirane.

Example 60.—Preparation of sodium cis- and trans-1,2-epoxy-2-chlorosulfonylethyl-1-phosphonate (A) Dimethyl 1 - bromo - 2 - chlorosulfonyl-1-phosphonate.—A solution of 20.5 g. (0.10 mole) of 1-bromoethylenesulfonyl chloride and 11.0 g. (0.10 mole) of dimethyl phosphite is gradually heated until reaction begins. The reaction temperature is then increased by 20° C. and kept there. Progress of the reaction is followed by observing the loss of starting sulfonyl chloride by vapor phase chromatography. When reaction is complete, the solution containing dimethyl 1-bromo-2-chlorosulfonylethyl-1-phosphonate is cooled and used in the next step.

(B) Dimethyl cis- and dimethyl trans-2-chlorosulfonylvinyl-1-phosphonate.—A well-stirred solution of 31.5 g. (0.10 mole) of dimethyl 1-bromo-2-chlorosulfonylethyl-1-phosphonate in 300 ml. of ethyl ether is cooled to −30° C. and 10.1 g. (0.10 mole) of triethylamine in 50 ml. of ether is added dropwise. The temperature is gradually raised to room temperature. When precipitation is complete, the reaction mixture is filtered to remove triethylammonium bromide and evaporated under reduced pressure to remove ether.

The residue, a mixture of two isomers, is fractionally distilled under reduced pressure to separate the cis- and trans-isomers.

(C) Trans - 2 - chlorosulfonylvinyl - 1 - phosphonic acid.—A mixture of 11.7 g. (0.05 mole) of dimethyl trans - 2 - chlorosulfonylvinyl-1-phosphonate, 2.0 g. (0.02 mole) of triethylamine and 54.3 g. (0.50 mole) of chlorotrimethylsilane protected from atmospheric moisture is heated at reflux until starting dimethyl ester is gone as judged by vapor phase chromatography. Excess chlorosilane is removed under reduced pressure, and the residue is taken up in benzene and filtered. The benzene is removed under reduced pressure, and the residue is poured into 100 ml. of water. The mixture is stirred at room temperature until a single phase results. Lyophilization affords the desired phosphonic acid.

In the same way, dimethyl cis-2-chlorosulfonylvinyl-1-phosphonate is converted to cis-2-chlorosulfonylvinyl-1-phosphonic acid.

(D) Sodium trans - 1,2 - epoxy - 2 - chlorosulfonylethyl-1-phosphonate.—A solution of 4.1 g. (0.02 mole) of trans-2-chlorosulfonylvinyl-1-phosphonic acid in 10 ml. of water and 10 ml. of methanol is adjusted to pH 5.5 with aqueous sodium hydroxide. Sodium tungstate dihydrate (0.66 g., 0.002 mole) and 2.6 ml. of 30% hydrogen peroxide are added and the mixture is warmed to 50° C. When peroxide is consumed (negative starch/iodide test), the mixture is cooled and lyophilized to afford the desired product.

Cis - 2 - chlorosulfonylvinyl - 1 - phosphonic acid is converted to sodium 1,2-epoxy-2-cis-chlorosulfonylethyl-1-phosphonate in the same way.

Example 61.—Preparation of trisodium trans-2-sulfono-1-phosphonooxirane

A well-stirred mixture of 4.45 g. (0.02 mole) of sodium trans - 1,2 - epoxy - 2 - chlorosulfonylethyl-1-phosphonate prepared as described in Example 60 and 20 ml. of water is titrated to pH 9 with aqueous sodium hydroxide. The mixture is maintained at pH 9 by adding increments of aqueous sodium hydroxide. Gradually solution occurs. When all is in solution and the pH remains constant at 9, the solution is lyophilized to afford the desired oxirane.

In the same way, trisodium cis-2-sulfono-1-phosphonooxirane is obtained from monosodium cis-1,2-epoxy-2-chlorosulfonylethyl-1-phosphonate.

Example 62.—Preparation of ammonium 1,2-epoxy-2-trans-sulfonamidoethyl-1-phosphonate Into a well-stirred slurry of 4.45 g. (0.02 mole) of monosodium 1,2 - epoxy - 2-trans-chlorosulfonylethyl-1-phosphonate in 50 ml. of tetrahydrofuran cooled to 0° C. is bubbled slowly anhydrous ammonia. When precipitation is complete, the solvent is removed by evaporation under reduced pressure and the residue is dried in vacuo to afford the crude desired sulfonamide.

In the same way, monosodium 1,2-epoxy-2-cis-chlorosulfonylethyl-1-phosphonate is converted to ammonium 1,2-epoxy-2-cis-sulfonamidoethyl-1-phosphonate.

Example 63.—Preparation of disodium trans-2-sulfonovinyl-1-phosphonate

A solution of 18.7 g. (0.10 mole) of 1-bromovinyl-1-phosphonic acid in 50 ml. of water is titrated to pH 5 with aqueous sodium hydroxide. A solution of 10.4 g. (0.10 mole) of sodium bisulfite is added and the solution is kept at room temperature for 24 hours. Upon evaporation under reduced pressure the desired sulfonate salt is obtained.

Disodium trans-2-sulfonovinyl-1-phosphonate is epoxidized with sodium tungstate/hydrogen peroxide as described above to give disodium trans-2-sulfono-1-phosphonooxirane.

Disodium trans - 2 - sulfonovinyl - 1 - phosphonate is converted to trans-2-chlorosulfonylvinyl - 1 - phosphonic acid by refluxing in thionyl chloride, removing excess thionyl chloride and pouring the residue into water. Evaporation and drying provides the desired sulfonyl chloride.

Example 64.—Preparation of disodium 1,2 - epoxy - 2-trans-(ethylsulfonyl)ethyl-1-phosphonate and the cis isomer (A) Dimethyl trans-2-(ethylthio)vinyl - 1 - phosphonate.—To an ice-cold solution of 6.2 g. (0.20 mole) of methanol, 15.6 g. (0.20 mole) of pyridine and 100 ml. of benzene is added dropwise 20.5 g. (0.10 mole) of trans-2-ethylthiovinyl-1-phosphonic dichloride in 50 ml. of benzene. When precipitation is complete, the mixture is filtered to remove pyridine hydrochloride and evaporated under reduced pressure to remove benzene. The oil so obtained can be distilled under reduced pressure to afford the desired ester, dimethyl trans-2-(ethylthio)vinyl-1-phosphonate.

(B) Dimethyl cis - 2 - (ethylthio)vinyl - 1 - phosphonate.—A solution of 9.8 g. (0.05 mole) of dimethyl trans-2-(ethylthio)vinyl-1-phosphonate in 150 ml. of benzene is irradiated with ultraviolet light. Progress of the isomerization is followed by vapor phase chromatography. When a suitable cis/trans ratio is achieved, the solution is chromatographed on silica gel using benzene/chloroform and chloroform/methanol mixtures as eluant. Careful chromatography affords the desired cis isomer.

(C) Dimethyl trans-2-(ethylsulfonyl)vinyl-1-phosphonate.—To a well-stirred solution of 8.6 ml. of (0.10 mole) of 30% hydrogen peroxide in 200 ml. of glacial acetic acid kept at about 0° C. is added dropwise 7.8 g. (0.04 mole) of dimethyl trans-2-(ethylthio)vinyl-1-phosphonate. The reaction mixture is maintained at 0° C. until the substrate phosphonate ester is consumed as judged by vapor phase chromatography. Excess peroxide is destroyed by dropwise addition of saturated aqueous sodium sulfite and most of the acetic acid is removed by evaporation in vacuo at room temperature. The residue is poured into 200 ml. of cold water and the mixture is extracted with chloroform. The chloroform extract is washed with water, dried with sodium sulfate and concentrated under reduced pressure to afford a liquid residue. Distillation of the residue under reduced pressure affords the desired sulfone.

In the same way, dimethyl cis-2-(ethylsulfonyl)-vinyl-1-phosphonate is prepared from dimethyl cis-2-(ethylthio)vinyl-1-phosphonate.

(D) Trans-2-ethylsulfonylvinyl - 1 - phosphonic acid.—A mixture of 11.4 g. (0.05 mole) of dimethyl trans-2-(ethylsulfonyl)vinyl-1-phosphonate, 5.0 g. (0.05 mole) of triethylamine and 108.5 g. (1.00 mole) of chlorotrimethylsilane (freshly distilled) protected from atmospheric moisture is refluxed until no starting ester remains as judged by vapor phase chromatography. Excess silane is removed under reduced pressure and the residue is taken up in benzene and filtered. The filtrate is evaporated under reduced pressure to remove benzene, and the residue is added to 200 ml. of water. The mixture is stirred vigorously until a single phase is present. Evaporation under reduced pressure affords the desired phosphonic acid.

In the same way, dimethyl cis-2-(ethylsulfonyl)vinyl-1-phosphonate is converted to cis-2-ethylsulfonylvinyl-1-phosphonic acid.

(E) Disodium 1,2-epoxy-2-trans-(ethylsulfonyl)ethyl-1-phosphonate and the cis isomer.—A solution of 4.0 g. (0.02 mole) of trans-2-ethylsulfonylvinyl-1-phosphonic acid in 20 ml. of water is titrated with dilute aqueous sodium hydroxide to pH 8.5. Hydrogen peroxide (30%, 1.7 ml., 0.02 mole) is added and the pH is maintained at 8.5 by continuous addition of dilute aqueous sodium hydroxide. Stirring is continued until peroxide is consumed. Lyophilization of the reaction mixture affords the desired epoxide.

Example 65.—Preparation of disodium 1,2-epoxy-2-trans- and disodium 1,2-epoxy-2-cis-(trifluoromethylsulfonyl)ethyl-1-phosphonate To 83 g. (0.40 mole) of phosphorous pentachloride suspended in 300 ml. of benzene is added with cooling 25.6 g. (0.20 mole) of trifluoromethylvinyl sulfide. After stirring for 15 hours, the mass is treated with sulfur dioxide. Distillation under reduced pressure affords the desired phosphonic dichloride.

Trans - 2 - (trifluoromethylthio)vinylphosphonic dichloride can be used in place of trans-2-ethylthiovinylphosphonic dichloride in the procedures described above to afford in an analogous manner disodium 1,2-epoxy-2-trans- and disodium 1,2-epoxy-2-cis-(trifluoromethylsulfonyl)ethyl-1-phosphonate.

Example 66.—Preparation of sodium 1,2-epoxy-trans-2-phenylethyl-1-phosphonate

Trans-2-phenylvinyl-1-phosphonic acid (3.0 g., 0.0128 mole) is dissolved in 15 ml. of water and the pH is adjusted to 6.0 with aqueous sodium hydroxide. Sodium tungstate dihydrate (165 mg., 0.0005 mole) and 3.4 ml. (0.04 mole) of 30% hydrogen peroxide are added. Slight cooling is necessary to keep the temperature below 35° C. After one hour the reaction mixture is lyophilized to afford the desired epoxide.

Example 67.—Preparation of sodium 1,2-epoxy-1-phenylethyl-1-phosphonate 1-phenylethylene-1-phosphonic acid (18.4 g., 0.10 mole) is dissolved in 100 ml. of water and the pH is adjusted to 5.5 with aqueous sodium hydroxide. Sodium tungstate dihydrate (1.65 g., 0.005 mole) and 10.3 ml. (0.12 mole) of 30% hydrogen peroxide are added. The reaction mixture is warmed to 50° C. and maintained there until the peroxide is consumed (negative starch/iodide test). The solution is evaporated in vacuo to dryness to afford the desired epoxide.

Example 68.—Preparation of sodium 1,2-epoxy-trans- and sodium 1,2 - epoxy-cis-2-(2 - pyridyl)ethyl-1-phosphonate (A) Dimethyl trans-2-(2-pyridyl)vinyl - 1 - phosphonate.—A solution of 10.3 g. (0.10 mole) of 2-ethynylpyridine and 11.0 g. (0.10 mole) of dimethylphosphite is heated gradually until reaction occurs. Consumption of starting materials is followed by vapor phase chromatography of the reaction mixture. When reaction is complete, the liquid is distilled under reduced pressure to afford the desired product.

(B) Dimethyl cis-2-(2-pyridyl)vinyl-1-phosphonate.—A solution of 10.6 g. (0.05 mole) of dimethyl trans-2-(2-pyridyl)vinyl-1-phosphonate in 150 ml. of benzene is irradiated with an ultraviolet lamp. Progress of the isomerization is followed by vapor phase chromatography.

When a suitable cis/trans ratio is obtained, the reaction solution is chromatographed on a silica gel column using benzene/chloroform and chloroform/methanol mixtures as eluants. Careful chromatography provides the cis isomer.

(C) Trans-2-(2-pyridyl)vinyl-1-phosphonic acid.—A mixture of 10.6 g. (0.05 mole) of dimethyl trans-2-(2-pyridyl)vinyl-1-phosphonate, 5.0 g. (0.05 mole) of triethylamine and 108.6 g. (1.0 mole) of chlorotrimethylsilane in a system protected from moisture is refluxed until no starting ester remains as judged by vapour phase chromatography. The reaction mixture is evaporated under reduced pressure to remove excess chlorotrimethylsilane, and the residue is taken up in benzene and filtered. The filtrate is evaporated under reduced pressure to remove benzene, and the residue is added to 100 ml. of water. The mixture is stirred vigorously until homogeneous. Evaporation of the solution under reduced pressure affords the desired free phosphonic acid.

In the same way, cis-2-(2-pyridyl)vinyl-1-phosphonic acid may be prepared from dimethyl cis-2-(2-pyridyl)vinyl-1-phosphonate.

(D) Sodium 1,2-epoxy-trans-2-(2-pyridyl)ethyl-1-phosphonate.—A solution of 3.70 g. (0.02 mole) of trans-2-(2-pyridyl)vinyl-1-phosphonic acid in 25 ml. of water is brought to pH 5.5 with aqueous sodium hydroxide. Sodium tungstate dihydrate (0.66 g., 0.002 mole) and 1.7 ml. (0.02 mole) of 30% hydrogen peroxide are added. The solution is warmed to 50° C. and maintained there until peroxide is consumed (negative starch/iodide test). Another 1.7 ml. (0.02 mole) of 30% hydrogen peroxide is added and heating is continued until no peroxide remains. The solution is concentrated under reduced pressure to afford a residue which contains the desired epoxide.

In the same way, cis-2-(2-pyridyl)vinyl-1-phosphonic acid is converted to sodium 1,2-epoxy-cis-2-(2-pyridyl)ethyl-1-phosphonate.

In a manner analogous to that described above, 2-ethynylthiophene is converted into sodium 1,2-epoxy-cis- and sodium 1,2-epoxy-trans-2-(2-thienyl)ethyl-1-phosphonate.

Example 69.—Preparation of sodium cis-1,2-epoxy-3-hydroxypropyl-1-phosphonate (A) Diisopropyl 3-hydroxypropyne-1-phosphonate.—To a solution of sodium diisopropyl phosphite, prepared from 2.3 g. of sodium and 16.6 g. of diisopropyl phosphite, in 100 ml. of dry tetrahydrofuran is added a solution of 21.8 g. of the tetrahydropyranyl ether of 3-bromopropargyl alcohol in 25 ml. of tetrahydrofuran. The reaction temperature is kept below −70° C. during the addition, and the reaction mixture is stirred at −70° C. for 12 hours. After warming to room temperature, most of the tetrahydrofuran is removed under reduced pressure, the residue added to 200 ml. of water and extracted with ether (3× 100 ml.). The combined ether extracts are washed with saturated sodium chloride and dried over magnesium sulfate. The residue, after removing the ether under reduced pressure, is dissolved in 100 ml. of methanol containing 2 ml. of concentrated hydrochloric acid, and the solution is heated under reflux for 10 minutes. The mixture is neutralized with sodium bicarbonate, filtered and dried over magnesium sulfate. Removal of the methanol under reduced pressure and distillation of the residue under reduced pressure give diisopropyl 3-hydroxypropyne-1-phosphonate.

(B) 3-hydroxypropyne-1-phosphonic acid.—A solution of 10 g. of diisopropyl 3-hydroxypropyne-1-phosphonate in 80 ml. of concentrated hydrochloric acid is heated at 100° C. for 30 minutes. The reaction mixture is evaporated under reduced pressure. The hydrochloric acid is removed from the residue by addition and evaporation of four 50 ml. portions of water. The residue, 3-hydroxypropyne-1-phosphonic acid, is dried at 60° C./0.1 mm.

(C) Sodium cis-3-hydroxypropenyl-1-phosphonate.—A solution of 2.72 g. of 3-hydroxypropyne-1-phosphonic acid in 20 ml. of water is taken to pH 4.5 with 1 N sodium hydroxide and freeze-dried. The sodium salt is dissolved in 30 ml. of pyridine and hydrogenated at room temperature and atmospheric pressure with 0.5 g. of 5% palladium on barium sulfate. After the required amount of hydrogen is absorbed, the catalyst is filtered off and the filtrate evaporated under reduced pressure to give sodium cis-3-hydroxypropenyl-1-phosphonate.

(D) Sodium cis-1,2-epoxy-3-hydroxypropyl-1-phosphonate.—To a solution of 1.60 g. of sodium cis-3-hydroxypropenyl-1-phosphonate and 0.165 g. of sodium tungstate dihydrate in 20 ml. of water is added 1.23 ml. of 30% aqueous hydrogen peroxide. The mixture is stirred at 55° C. for 6 hours and then freeze-dried. The residue is triturated with three 10 ml. portions of methanol. Removal of the methanol under reduced pressure gives sodium cis-1,2-epoxy-3-hydroxypropyl-1-phosphonate.

Example 70.—Preparation of sodium cis-3-carbamoyloxy-1,2-epoxypropyl-1-phosphonate To a mixture of 1.76 g. of sodium cis-1,2-epoxy-3-hydroxypropyl-1-phosphonate prepared as described in Example 69 in 10 ml. of pyridine is added dropwise at room temperature 0.80 g. of carbamyl chloride. The mixture is stirred for 24 hours at room temperature and the solvent then removed under reduced pressure to give sodium cis-3-carbamoyloxy-1,2-epoxypropyl-1-phosphonate.

In an analogous manner, sodium cis-1,2-epoxy-3-hydroxypropyl-1-phosphonate is reacted with N-methylcarbamyl chloride and N,N-dimethylcarbamyl chloride to give sodium cis-N-methyl- and sodium cis-N,N-dimethyl-3-carbamoyloxy-1,2-epoxypropyl-1-phosphonate, respectively.

In an analogous manner, sodium trans-1,2-epoxy-3-hydroxypropyl-1-phosphonate is reacted with carbamyl chloride, N-methylcarbamyl chloride and N,N-dimethylcarbamyl chloride to give sodium trans-3-carbamoyloxy-, sodium trans-N-methyl-3-carbamoyloxy-, and sodium trans-N,N-dimethyl-3-carbamoyloxy-1,2-epoxypropyl-1-phosphonate.

Example 71.—Preparation of sodium cis-3-ethoxycarbonyloxy-1,2-epoxypropyl-1-phosphonate To a solution of 1.76 g. of sodium cis-1,2-epoxy-3-hydroxypropyl-1-phosphonate and 0.84 g. of sodium bicarbonate in 10 ml. of water at 0° C. is added dropwise 1.09 g. of ethyl chloroformate. The solution is allowed to warm to room temperature and stand for 4 hours. It is then freeze-dried to give sodium cis-3-ethoxycarbonyloxy-1,2-epoxypropyl-1-phosphonate.

In a similar manner, sodium trans-1,2-epoxy-3-hydroxypropyl-1-phosphonate is reacted with ethyl chloroformate to give sodium trans-3-ethoxycarbonyloxy-1,2-epoxypropyl-1-phosphonate.

Example 72.—Preparation of sodium cis-3-acetoxy-1,2-epoxypropyl-1-phosphonate

A mixture of 1.76 g. of sodium cis-1,2-epoxy-3-hydroxypropyl-1-phosphonate and 10 ml. of acetic anhydride is heated at 100° C. for 1 hour. The anhydride is removed under reduced pressure and the residue dissolved in 20 ml. of water and then evaporated under reduced pressure to give sodium cis-3-acetoxy-1,2-epoxypropyl-1-phosphonate.

In an analogous manner, sodium trans-1,2-epoxy-3-hydroxypropyl-1-phosphonate is reacted with acetic anhydride to give sodium trans-3-acetoxy-1,2-epoxypropyl-1-phosphonate.

Example 73.—Preparation of sodium trans-2-formyl-epoxyethyl-1-phosphonate

To a stirred solution of 1.76 g. of sodium trans-3-hydroxy-1,2-epoxypropyl-1-phosphonate in 50 ml. of pyridine is added 4.43 g. of powdered lead tetraacetate. The deep red mixture is stirred at room temperature for 24 hours. The solid lead acetate is filtered off and washed with ethanol. The filtrate and washings are evaporated under reduced pressure to give sodium trans-2-formylepoxyethyl-1-phosphonate.

Similarly, sodium cis-3-hydroxy-1,2-epoxypropyl-1-phosphonate is oxidized to sodium cis-2-formylepoxyethyl-1-phosphonate.

Example 74.—Preparation of sodium trans-3-methanesulfonyloxy-1,2-epoxypropyl-1-phosphonate To a solution of 1.76 g. of sodium cis-1,2-epoxy-3-hydroxypropyl-1-phosphonate in 10 ml. of pyridine is added 0.78 ml. of methanesulfonyl chloride. The mixture is stirred at room temperature for 4 hours and then kept at 0° C. overnight. The solid is filtered, and the filtrate is evaporated under reduced pressure. The residue is dissolved in 20 ml. of water and evaporated under reduced pressure to give sodium trans-3-methanesulfonyloxy-1,2-epoxypropyl-1-phosphonate.

Similarly, sodium cis-3-hydroxy-1,2-epoxypropyl-1-phosphonate affords sodium cis-3-methanesulfonyloxy-1,2-epoxypropyl-1-phosphonate.

Example 75.—Preparation of sodium trans-3-methoxy-1,2-epoxypropyl-1-phosphonate

A 2.54 g. sample of sodium trans-3-methanesulfonyloxy-1,2-epoxypropyl-1-phosphonate prepared as in Example 74 is heated under reflux for 12 hours in a nitrogen atmosphere with a solution of 0.46 g. of sodium in 20 ml. of methanol. The solvent is removed under reduced pressure and the residue dissolved in 20 ml. of water. The pH is adjusted to 4.0 with dilute hydrochloric acid and the solution freeze-dried to give sodium trans-3-methoxy-1,2-epoxypropyl-1-phosphonate.

Similarly, sodium cis-3-methanesulfonyloxy-1,2-epoxypropyl-1-phosphonate gives sodium cis-3-methoxy-1,2-epoxypropyl-1-phosphonate.

Example 76.—Preparation of sodium trans-3-ethylthio-1,2-epoxypropyl-1-phosphonate To a solution of 0.23 g. of sodium in 5 ml. of methanol is added at room temperature a solution of 0.70 g. of ethyl mercaptan in 5 ml. of methanol. Then 2.54 g. of sodium trans-3-methanesulfonyloxy-1,2-epoxypropyl-1-phosphonate is added and the mixture heated under reflux for 8 hours. The solvent is removed under reduced pressure to give sodium trans-3-ethylthio-1,2-epoxypropyl-1-phosphonate.

Similarly, sodium cis-3-methanesulfonyloxy-1,2-epoxypropyl-1-phosphonate gives sodium cis-3-ethylthio-1,2-epoxypropyl-1-phosphonate.

Example 77.—Preparation of sodium trans-3-mercapto-1,2-epoxypropyl-1-phosphonate Hydrogen sulfide is bubbled into a solution of 1.20 g. of sodium sulfide nonahydrate in 10 ml. of water until it is acid to phenolphtholein. A 2.54 g. sample of sodium trans-3-methanesulfonyloxy-1,2-epoxypropyl-1 - phosphonate is added, and the solution heated under reflux for 4 hours. The cooled reaction mixture is freeze-dried to give sodium trans-3-mercapto-1,2-epoxypropyl-1 - phosphonate.

Similarly, sodium cis-3-methanesulfonyloxy-1,2-epoxypropyl-1-phosphonate gives sodium cis-3-mercapto-1,2-epoxypropyl-1-phosphonate.

Example 78.—Preparation of disodium epoxyethyl-1-,1-diphosphonate (A) Vinylidene-1,1-diphosphonic acid.—A solution of 2.0 g. of tetraethyl vinylidene-1,1-diphosphonate and 6.0 ml. of trimethylchlorosilane is heated in a Carius tube at 150° C. for 5 hours. The contents are transferred to a round-bottomed flask with ether, and the volatile material is removed under reduced pressure. The residue is stirred with 70 ml. of water at room temperature for 30 minutes. The mixture is then extracted with chloroform (2× 25 ml.) and ether (1× 25 ml.) and then evaporated under reduced pressure to give vinylidene-1,1-diphosphonic acid.

(B) Disodium epoxyethyl-1,1-diphosphonate.—To a mixture of 1.88 g. of vinylidene-1,1-diphosphonic acid, 1.68 g. of sodium bicarbonate and 0.165 g. of sodium tungstate dihydrate in 10 ml. of water is added 1.23 ml. of 30% aqueous hydrogen peroxide. The mixture is heated at 55° C. for 6 hours and then freeze-dried. The residue is triturated with three 15 ml. portions of methanol. Evaporation of the methanol under reduced pressure gives disodium epoxyethyl-1,1-diphosphonate.

Example 79.—Preparation of sodium cis-2-carbomethoxyepoxyethyl-1-phosphonate

To a solution of 1.66 g. of cis-2-carbomethoxyvinyl-1-phosphonic acid, 0.84 g. of sodium bicarbonate and 0.165 g. of sodium tungstate dihydrate in 10 ml. of water is added 1.23 ml. of 30% aqueous hydrogen peroxide. The mixture is heated at 55° C. for 5 hours and then freeze-dried. The residue is triturated with three 15 ml. portions of methanol. Evaporation of the methanol under reduced pressure gives sodium cis-2-carbomethoxyepoxyethyl-1-phosphonate.

Example 80.—Preparation of sodium trans-2-carbomethoxyepoxyethyl-1-phosphonate (A) Trans-2-carbomethoxylvinyl-1-phosphonic acid.— A mixture of 2.0 g. of diethyl trans-2-carbomethoxyvinyl-1-phosphonate and 6.0 ml. of trimethylchlorosilane is heated in a Carius tube at 150° C. for 5 hours. The contents are transferred to a round-bottomed flask with ether, and the volatile material is removed under reduced pressure. The residue is stirred with 50 ml. of water at room temperature for 30 minutes. The aqueous mixture is extracted with chloroform (2× 25 ml.) and ether (1× 25 ml.) and evaporated under reduced pressure to afford trans-2-carbomethoxyvinyl-1-phosphonic acid.

(B) Sodium trans-2-carbomethoxyepoxyethyl-1-phosphonate.—Trans-2-carbomethoxyvinyl-1-phosphonic acid is then epoxidized using the procedure described in Example 79 to obtain sodium trans-2-carbomethoxyepoxyethyl-1-phosphonate.

Example 81.—Preparation of disodium 1-carbomethoxyepoxyethyl-1-phosphonate (A) 1-carbomethoxyvinyl-1-phosphonic acid.—When diethyl 1-carbomethoxyvinyl-1-phosphonate is reacted with trimethylchlorosilane and the resulting product is hydrolyzed with water using the procedures described in Example 79, 1-carbomethoxyvinyl-1-phosphonic acid is obtained.

(B) Sodium 1-bromo-1-carbomethoxy-2-hydroxyethyl-1-phosphonate.—An aqueous solution of 1.66 g. of 1-carbomethoxyvinyl-1-phosphonic acid, 0.84 g. of sodium bicarbonate and 1.40 g. of N-bromoacetamide is stirred at room temperature for 24 hours. The water is evaporated under reduced pressure. The residue is triturated with three 10 ml. portions of chloroform to remove the acetamide, and the sodium 1-bromo-1-carbomethoxy-2-hydroxyethyl-1-phosphonate remaining is filtered and dried.

(C) Disodium 1-carbomethoxyepoxyethyl-1-phosphonate.—To a solution of 2.85 g. of sodium 1-bromo-1-carbomethoxy-2-hydroxyethyl-1-phosphonate in 10 ml. of water is added 0.40 g. of sodium hydroxide. The pH of the mixture is maintained above 9 by addition of 1 N sodium hydroxide. When there is no further change in the pH, the mixture is freeze-dried to give disodium 1-carbomethoxyepoxyethyl-1-phosphonate.

Example 82.—Preparation of sodium 1-carboxy-epoxyethyl-1-phosphonate

A solution of 2.26 g. of disodium 1-carbomethoxyepoxyethyl-1-phosphonate and 0.40 g. of sodium hydroxide in 20 ml. of water is heated at 100° C. in a nitrogen atmosphere for 6 hours. The pH of the cooled solution is adjusted to 4.0 with 2 N hydrochloric acid and freeze-dried to give sodium 1-carboxyepoxyethyl-1-phosphonate.

Example 83.—Preparation of sodium 1-p-toluenesulfonamido-2,3-epoxypropyl-2-phosphonate To a solution of 1.75 g. of sodium 1-amino-2,3-epoxypropyl-2-phosphonate prepared as described in Example 18 and 0.40 g. of sodium hydroxide in 20 ml. of water is added 1.91 g. of p-toluenesulfonyl chloride. The mixture is stirred vigorously and kept at 60° C. for 5 hours. It is then freeze-dried to give sodium 1-p-toluenesulfonamido-2,3-epoxypropyl-2-phosphonate.

Similarly, sodium 1 - amino - 2,3 - epoxypropyl-2-phosphonate is reacted with methanesulfonyl chloride to give sodium 1-methanesulfonidamido-2,3-epoxypropyl-2-phosphonate.

In the same way, the cis- and trans-isomers of sodium 3-amino-1,2-epoxypropyl-1-phosphonate are reacted with p-toluenesulfonyl chloride and methanesulfonyl chloride to yield the cis- and trans-isomers of sodium 3-p-toluenesulfonamido- and sodium 3-methanesulfonamido-1,2-epoxypropyl-1-phosphonate.

Example 84.—Preparation of trisodium 3,4-epoxy-3-phosphono-2-methylbutyrate (A) 1-benzyl, 4-ethyl 2-methyl-3-diethylphosphonosuccinate.—Triethyl phosphonoacetate (22.4 g., 0.1 mole) is dissolved in 100 ml. of distilled dimethoxyethane. 4.8 grams (0.1 mole) of 50% sodium hydride dispersion is added in small portions with stirring. After the addition is complete, 23 g. (0.095 mole) of benzyl α-bromopropionate is added dropwise. The mixture is maintained at 50° C. for one hour and 5 ml. of ethanol is added cautiously. The solvent is removed by concentration in vacuo and the residue is distilled to give 1-benzyl, 4-ethyl 2-methyl-3-diethylphosphonosuccinate.

(B) Potassium, 4-ethyl 2-methyl-3-diethylphosphonosuccinate.—1-benzyl, 4-ethyl 2 - methyl - 3 - diethylphosphonosuccinate (30 g., 0.078 mole) is dissolved in 250 ml. of methanol containing 10 g. of 10% Pd/C catalyst and 7.8 g. of potassium bicarbonate. The mixture is agitated at room temperature and under an atmosphere of hydrogen (40 p.s.i.) for 15 minutes. The catalyst is filtered and the solvent removed in vacuo to give potassium, 4-ethyl 2-methyl-3-diethylphosphonosuccinate.

(C) 4-ethyl 2-methyl-3-bromo-3-diethylphosphonosuccinic acid.—Potassium, 4-ethyl 2-methyl-3-diethylphosphonosuccinate (20 g., 0.06 mole) is dissolved in 100 ml. of distilled dimethoxyethane. 2.88 grams (0.06 mole) of 50% sodium hydride dispersion is added in small portions with stirring. After the addition is complete, 8.65 g. (0.054 mole) of bromine is added dropwise. 5 ml. of ethanol is added cautiously and the solvent is removed in vacuo. The residue is dissolved in water and extracted with ethyl acetate. The aqueous layer is acidified and extracted again with ethyl acetate. The organic layer is dried over sodium sulfate and concentrated to give 4-ethyl 2-methyl-3-bromo-3-diethylphosphonosuccinic acid.

(D) 3 - bromo - 4-hydroxy-3-diethylphosphono-2-methylbutyric acid.—4-ethyl 2-methyl-3-bromo-3-diethylphosphonosuccinic acid (18 g., 0.05 mole) is dissolved in 100 ml. of dry tetrahydrofuran. A solution of lithium borohydride (0.83 g., 0.038 mole) in 10 ml. of dry tetrahydrofuran is added dropwise to the cooled, stirred solution. After the addition is complete, the mixture is stirred at room temperature for one hour and any excess hydride is decomposed by the addition of ethyl acetate. Dilute hydrochloric acid is added and the mixture is extracted several times with ethyl acetate. The organic extracts are dried and the solvent is removed in vacuo to give 3-bromo - 4 - hydroxy-3-diethylphosphono-2-methylbutyric acid.

(E) 3 - bromo-4-hydroxy-3-phosphono-2-methylbutyric acid.—3 - bromo-4-hydroxy-3-diethylphosphono-2-methylbutyric acid (15 g.) is heated overnight at 100° C. with 100 ml. of 1:1 concentrated hydrochloric acid:water. The solvent is removed in vacuo and the oily residue flushed twice with water to give 3-bromo-4-hydroxy-3-phosphono-2-methylbutyric acid.

(F) Trisodium 3,4-epoxy-3-phosphono-2-methylbutyrrate.—One gram of 3-bromo-4-hydroxy-3-phosphono-2-methylbutyric acid is dissolved in 10 ml. of water and the pH is adjusted to 10 with sodium hydroxide solution. After 15 minutes at room temperature, the solution is neutralized to pH 6.8 with Dowex 1 (H+). The solution is lyophilized to give tirsodium 3,4-epoxy-3-phosphono-2-methylbutyrate.

Example 85.—Preparation of 1-methyl, disodium 3,4-epoxy-3-phosphono-2-methylbutyrate 3-bromo-4-hydroxy-3-phosphono-2-methylbutyric acid (10 g.) prepared as described in Example 84(E) is dissolved in 50 ml. of dry methanol. Anhydrous hydrogen chloride is bubbled through the chilled solution for several minutes and the solution is allowed to stand overnight at room temperature. The solvent is removed in vacuo to give 1-methyl-3-bromo-4-hydroxy-3-phosphono-2-methylbutyric acid which is reacted with sodium hydroxide as described in Example 84(F) to afford 1-methyl, disodium 3,4-epoxy-3-phosphono-2-methylbutyrate.

Example 86.—Preparation of disodium N,N-dimethyl-3,4-epoxy-3-phosphono-2-methylbutyramide 1-methyl, disodium 3,4-epoxy - 3 - phosphono-2-methylbutyrate prepared as described in Example 85 (1.0 g.) is dissolved in 10 ml. of methanol. An excess of dimethylamine is added and the solution is allowed to stand overnight at room temperature. The solution is concentrated in vacuo to give disodium N,N-dimethyl-3,4-epoxy-3-phosphono-2-methylbutyramide.

Example 87.—Preparation of disodium 3,4-epoxy-3-phosphono-2-methylbutyrohydrazide 1-methyl, disodium 3,4-epoxy-3-phosphono-2-methylbutyrate prepared as described in Example 85 (1.0 g.) is dissolved in 10 ml. of methanol. One equivalent of hydrazine hydrate is added and the solution is allowed to stand overnight at room temperature. The solution is concentrated in vacuo to give disodium 3,4-epoxy-3-phosphono-2-methylbutyrohydrazide.

Example 88.—Preparation of disodium 3,4-epoxy-3-phosphono-2-methylbutyrohydroxamate 1-methyl, disodium 3,4-epoxy-3-phosphono-2-methylbutyrate prepared as described in Example 85 (1.0 g.) is dissolved in 10 ml. of methanol. One equivalent of hydroxylamine hydrochloride is added and the solution is chilled. One equivalent of sodium methoxide is added in small portions with stirring and the reaction mixture is allowed to stand overnight at room temperature. The solvent is removed in vacuo to give disodium 3,4-epoxy-3-phosphono-2-methylbutyrohydroxamate.

Example 89.—Preparation of methyl trans-3,4-epoxy-4-phosphonobutyrate (A) Methyl trans - 4-phosphonobut-3-enoate.—Methyl succinaldehydrate (11.6 g., 0.1 mole) and 17.0 g. (0.125 mole) of phosphorous trichloride are mixed in an evaporating dish. After 2 hours, 30 g. of glacial acetic acid is added and the mixture is allowed to stand overnight. Anhydrous hydrogen chloride is passed into the mixture for 20 minutes. After standing, the filter cake is broken up and the excess liquid is removed. The residue is triturated with ether. The solid is heated at 200° C. to give methyl trans-4-phosphonobut-3-enoate.

(B) Methyl trans-3,4-epoxy-4-phosphonobutyrate.—
Methyl trans-4-phosphonobut-3-enoate (10 g.) is dissolved in 500 ml. of water containing 200 mg. sodium tungstate and the pH is adjusted to 4.8 with sodium hydroxide. The mixture is heated to 50° C. and 1.5 equivalents of 30% hydrogen peroxide are added slowly. After consumption of the hydrogen peroxide, the solution is lyophilized to give methyl trans-3,4-epoxy-4-phosphonobutyrate.

Following the procedures described in Examples 86, 87 and 88 using methyl trans-3,4-epoxy-4-phosphonobutyrate in place of 1-methyl, disodium 3,4-epoxy-3-phosphono-2-methyl butyrate, the corresponding N,N-dimethyl amide, hydrazide and hydroxamate are obtained, respectively.

Example 90.—Preparation of disodium trans-3,4-epoxy-4-phosphonobutyrate (A) Trans-4-phosphonobut-3-enoic acid.—Methyl trans-4-phosphonobut-3-enoate prepared as described in Example 89 (2.0 g.) is heated in 8.0 ml. of 1:1 concentrated hydrochloric acid:water overnight and the solvent concentrated in vacuo. The residue is flushed with water several times to give trans-4-phosphonobut-3-enoic acid.

(B) Disodium trans-3,4-epoxy-4-phosphonobutyrate.—
Trans-4-phosphonobut-3-enoic acid is epoxidized using the procedures shown in Example 89(B) at pH 5.0-5.5 to give disodium trans-3,4-epoxy-4-phosphonobutyrate.

Example 91.—Preparation of disodium cis-3,4-epoxy-4-phosphonobutyrate (A) Triethyl 4-phosphonobut-3-ynoate.—Sodium hydride (4.8 g., 0.1 mole) in the form of a 50% dispersion is added in small portions to a solution of diethyl ethynylphosphonate (16.2 g. 0.1 mole) in 100 ml. of dry dimethoxyethane. After the evolution of hydrogen stops, 16.7 g. (0.1 mole) of ethyl bromoacetate is added dropwise to the chilled solution. The mixture is then stirred for one hour at room temperature and the solvent is removed in vacuo. The residue is vacuum distilled to give triethyl 4-phosphonobut-3-ynoate.

(B) Triethyl cis-4-phosphonobut-3-enoate.—Triethyl 4-phosphonobut-3-ynoate (20 g., 0.08 mole) is dissolved in 200 ml. of methanol and 2 g. of 10% Pd/C catalyst is added. The mixture is hydrogenated under a hydrogen atmosphere of 40 p.s.i. with shaking until 0.1 mole of hydrogen is consumed. The mixture is filtered and the solvent is concentrated. The oily residue is distilled in vacuo to give triethyl cis-4-phosphonobut-3-enoate.

(C) Cis-4-phosphonobut-3-enoic acid.—Triethyl cis-4-phosphonobut-3-enoate (18 g.) is dissolved in 100 ml. of 1:1 concentrated hydrochloric acid:water. The solution is maintained at 100° C. for 16 hours before concentrating to a yellow oil. The oil is flushed three times with water to give crude cis-4-phosphonobut-3-enoic acid.

(D) Disodium cis-3,4-epoxy-4-phosphonobutyrate.—
Cis-4-phosphonobut-3-enoic acid (1.0 g.) is dissolved in 50 ml. of water and the pH is adjusted to 5.0-5.5 with sodium hydroxide and 20 mg. of sodium tungstate is added. The solution is heated to 50° C. and 1.5 equivalents of 30% hydrogen peroxide are added. The solution is lyophilized after consumption of the peroxide to give disodium cis-3,4-epoxy-4-phosphonobutyrate.

Example 92.—Preparation of sodium cis-1,2-epoxy-3-(carboxymethyl)propylphosphonate (A) Methyl cis-4-phosphonobut-3-enoate.—Cis-4-phosphonobut-3-enoic acid (10 g.) is dissolved in 100 ml. of dry methanol. Anhydrous hydrogen chloride is bubbled through the chilled solution for several minutes and the solution is allowed to stand overnight at room temperature. The methanol is concentrated in vacuo to give an oily residue of methyl cis-4-phosphonobut-3-enoate.

(B) Sodium cis-1,2-epoxy-3-(carboxymethyl)propylphosphonate.—Methyl cis-4-phosphonobut-3-enoate is epoxidized following the procedures described in Example 91D at pH 4.8 to give sodium cis-1,2-epoxy-3-(carboxymethyl)propylphosphonate.

Example 93.—Preparation of disodium cis-N,N-dimethyl-3,4-epoxy-3-phosphonobutyramide When sodium cis-1,2-epoxy-3-(carboxymethyl)propylphosphonate is substituted for 1-methyl, disodium 3,4-epoxy-3-phosphono-2-methylbutyrate in the process described in Example 86, disodium cis-N,N-dimethyl-3,4-epoxy-3-phosphonobutyramide is obtained.

Example 94.—Preparation of disodium cis-3,4-epoxy-3-phosphonobutyrohydrazide

When sodium cis-1,2-epoxy-3-(carboxymethyl)propylphosphonate is substituted for 1-methyl, disodium 3,4-epoxy-3-phosphono-2-methylbutyrate in the process described in Example 87, disodium cis-3,4-epoxy-3-phosphonobutyrohydrazide is obtained.

Example 95.—Preparation of disodium cis-3,4-epoxy-3-phosphonobutyrohydroxamate

When sodium cis-1,2-epoxy-3-(carboxymethyl)propylphosphonate is substituted for 1-methyl, disodium 3,4-epoxy-3-phosphono-2-methylbutyrate in the process described in Example 88, disodium cis-3,4-epoxy-3-phosphonobutyrohydroxamate is obtained.

Example 96.—Preparation of disodium trans-1,2-dicarboxyepoxyethyl-1,2-diphosphonate (A) Tetraethyl 1-bromo-1,2-dicarbethoxyethyl-1,2-diphosphonate.—To a suspension of 2.40 g. of sodium hydride in 100 ml. of dry dimethoxyethane in a nitrogen atmosphere is added dropwise at room temperature a solution of 44.6 g. of tetraethyl 1,2-dicarbethoxyethyl-1,2-diphosphonate. After stirring at room temperature for 3 hours, the mixture is heated at 50° C. for 2 hours. It is then added dropwise to an ice-cold solution of 16.0 g. of bromine in 50 ml. of dry dimethoxyethane in a nitrogen atmosphere. The mixture is allowed to warm to room temperature, concentrated on a rotary evaporator, poured into 250 ml. of ice-water containing a few grams of sodium bisulfate and extracted with ether (4× 150 ml.). The combined ether extracts are washed with saturated sodium chloride solution and dried over magnesium sulfate. Removal of the ether under reduced pressure gives tetraethyl 1-bromo-1,2-dicarbethoxyethyl-1,2-diphosphonate.

(B) 1-bromo-1,2-dicarboxyethyl-1,2-diphosphonic acid.—A mixture of 30 g. of tetraethyl 1-bromo-1,2-dicarbethoxyethyl-1,2-diphosphonate and 240 ml. of concentrated hydrochloric acid is heated at 100° C. for 48 hours. The reaction mixture is evaporated under reduced pressure. The hydrochloric acid is removed from the residue by addition and evaporation of four 150 ml. portions of water to give 1-bromo-1,2-dicarboxyethyl-1,2-diphosphonic acid.

(C) Trans-1,2-dicarboxyvinyl-1,2-diphosphonic acid.—
To a solution of 7.14 g. of 1-bromo-1,2-dicarboxyethyl-1,2-diphosphonic acid in 250 ml. of dry dimethyl sulfoxide in a nitrogen atmosphere is added 20.2 g. of potassium t-butoxide. The gelatinous mixture is stirred vigorously at room temperature for 36 hours. It is then poured into 2 liters of cold water and the pH of the solution adjusted to 11 with concentrated hydrochloric acid. A solution of 30.6 g. of silver nitrate in 200 ml. of water is added, and the suspension is stirred for 30 minutes with protection from light. The silver salt is filtered and washed with water. The moist salt is suspended in 250 ml. of water, and hydrogen sulfide is bubbled into the suspension for 15 minutes. The silver sulfide is filtered and washed with water. Evaporation of the filtrate and washings under reduced pressure gives trans-1,2-dicarboxyvinyl-1,2-diphosphonic acid.

(D) Disodium trans-1,2-dicarboxyepoxyethyl-1,2-diphosphonate.—To a solution of 2.76 g. of trans-1,2-dicarboxyvinyl-1,2-diphosphonic acid, 1.68 g. of sodium bicarbonate and 0.165 g. of sodium tungstate dihydrate in 10 ml. of water is added 1.23 ml. of 30% aqueous hydrogen peroxide. The mixture is heated at 55° C. for 6 hours and then freeze-dried. The residue is triturated with three 15 ml. portions of methanol. Evaporation of the methanol under reduced pressure gives disodium trans-1,2-dicarboxyepoxyethyl-1,2-diphosphonate.

Example 97.—Preparation of disodium cis-1-carboxy-2-phenylepoxyethyl-1,2-diphosphonate (A) Tetraethyl 1 - bromo - 1-carbomethoxy-2-phenylethyl-1,2-diphosphonate.—When the process of Example 96(A) is repeated using tetraethyl 1-phenyl-2-carbomethoxyethyl-1,2-diphosphonate in place of tetraethyl 1,2-dicarbethoxyethyl-1,2-diphosphonate, tetraethyl 1-bromo-1-carbomethoxy-2-phenylethyl-1,2-diphosphonate is obtained.

(B) 1-bromo-1-carboxy-2-phenylethyl-1,2-diphosphonic acid.—A mixture of 30 g. of tetraethyl 1-bromo-1-carbomethoxy-2-phenylethyl-1,2-diphosphonate and 240 ml. of concentrated hydrochloric acid is heated at 100° C. for 48 hours. The resulting reaction mixture is evaporated under reduced pressure and the hydrochloric acid is removed from the residue by addition and evaporation of four 150 ml. portions of water to give 1-bromo-1-carboxy-2-phenylethyl-1,2-diphosphonic acid.

(C) Cis - 1 - carboxy - 2 - phenylvinyl - 1,2-diphosphonic acid.—To a solution of 7.04 g. of 1-bromo-1-carboxy - 2 - phenylethyl - 1,2 - diphosphonic acid in 250 ml. of dry dimethyl sulfoxide in a nitrogen atmosphere is added 20.2 g. of potassium t-butoxide. The gelatinous mixture is stirred vigorously at room temperature for 36 hours. It is then poured into 2 liters of cold water and the pH of the solution is adjusted to 11 with concentrated hydrochloric acid. A solution of 30.6 g. of silver nitrate in 200 ml. of water is added, and the suspension is stirred for 30 minutes with protection from light. The silver salt is filtered and washed with water. The moist salt is suspended in 250 ml. of water, and hydrogen sulfide is bubbled into the suspension for 15 minutes. The silver sulfide is filtered and washed with water. Evaporation of the filtrate and washings under reduced pressure gives cis - 1 - carboxy - 2 - phenylvinyl-1,2-diphosphonic acid.

(D) Disodium cis - 1 - carboxy - 2 - phenylepoxyethyl-1,2-diphosphonate.—To a solution of 3.08 g. of cis-1-carboxy - 2 - phenylvinyl - 1,2 - diphosphonic acid in 10 ml. of water is added 1.23 ml. of 30% aqueous hydrogen peroxide. The mixture is heated at 55° C. for 6 hours and then freeze-dried. The residue is triturated with three 15 ml. portions of methanol. Evaporation of the methanol under reduced pressure gives disodium cis-1-carboxy-2-phenylepoxyethyl-1,2-diphosphonate.

Example 98.—Preparation of sodium 2-acetyl-1,2-epoxy-3-oxobutyl-1-phosphonate (A) 2 - acetyl - 3 - oxo - 1-butenyl-1-phosphonic acid.—A mixture of 2.0 g. of diethyl 2-acetyl-3-oxo-1-butenyl-1-phosphonate and 6.0 g. of trimethylchlorosilane is heated in a Carius tube at 150° C. for 5 hours. The contents are transferred to a round-bottomed flask with ether, and the volatile material is removed under reduced pressure. The residue is stirred with 70 ml. of water at room temperature for 30 minutes. The mixture is extracted with chloroform (2× 25 ml.) and ether (1× 25 ml.) and evaporated under reduced pressure to give 2-acetyl-3-oxo-1-butenyl-1-phosphonic acid.

(B) Sodium 2 - acetyl - 1,2-epoxy-3-oxobutyl-1-phosphonate.—To a mixture of 1.92 g. of 2-acetyl-3-oxo-1-butenyl - 1 - phosphonic acid, 0.84 g. of sodium bicarbonate and 0.165 g. of sodium tungstate dihydrate in 10 ml. of water is added 1.23 ml. of 30% aqueous hydrogen peroxide. The mixture is heated at 55° C. for 6 hours and then freeze-dried. The residue is triturated with three 15 ml. portions of methanol. Evaporation of the methanol under reduced pressure gives sodium 2-acetyl-1,2-epoxy-3-oxobutyl-1-phosphonate.

Example 99.—Preparation of sodium 2-carbethoxy-1,2-epoxy-3-oxobutyl-1-phosphonate (A) 2 - carbethoxy - 3 - oxo - 1 - butenyl-1-phosphonic acid.—A mixture of 2.0 g. of diethyl 2-carbethoxy-3-oxo - 1 - butenyl - 1 - phosphonate and 6.0 g. of trimethylchlorosilane is heated in a Carius tube at 150° C. for 5 hours. The contents are transferred to a round-bottomed flask with ether, and the volatile material is removed under reduced pressure. The residue is stirred with 70 ml. of water at room temperature for 30 minutes. The mixture is extracted with chloroform (2× 25 ml.) and ether (1× 25 ml.) and evaporated under reduced pressure to give 2 - carbethoxy-3-oxo-1-butenyl-1-phosphonic acid.

(B) Sodium 2 - carbethoxy - 1,2-epoxy-3-oxobutyl-1-phosphonate.—To a mixture of 1.92 g. of 2-carbethoxy-3-oxo-1-butenyl-1-phosphonic acid, 0.84 g. of sodium bicarbonate and 0.165 g. of sodium tungstate dihydrate in 10 ml. of water is added 1.23 ml. of 30% aqueous hydrogen peroxide. The mixture is heated at 55° C. for 6 hours and then freeze-dried. The residue is triturated with three 15 ml. portions of methanol. Evaporation of the methanol under reduced pressure gives sodium 2-carbethoxy-1,2-epoxy-3-oxobutyl-1-phosphonate.

Example 100.—Preparation of sodium cis-1-carbethoxy-1,2-epoxy-2-phenylethylphosphonate (A) Cis - 1 - carbethoxy - 2 - phenylvinylphosphonic acid.—A mixture of 2.0 g. of diethyl cis-1-carbethoxy-2-phenylvinylphosphonate and 6.0 g. of trimethylchlorosilane is heated in a Carius tube at 150° C. for 5 hours. The contents are transferred to a round-bottomed flask with ether, and the volatile material is removed under reduced pressure. The residue is stirred with 70 ml. of water at room temprature for 30 minutes. The mixture is extracted with chloroform (2× 25 ml.) and ether (1× 25 ml.) and evaporated under reduced pressure to give cis-1-carbethoxy-2-phenylvinylphosphonic acid.

(B) Sodium cis-1-carbethoxy-1,2-epoxy-2-phenylethylphosphonate.—To a mixture of 1.92 g. of cis - 1-carbethoxy-2-phenylvinylphosphonic acid, 0.84 g. of sodium bicarbonate and 0.165 g. of sodium tungstate dihydrate in 10 ml. of water is added 1.23 ml. of 30% aqueous hydrogen peroxide. The mixture is heated at 55° C. for 6 hours and then freeze-dried. The residue is triturated with three 15 ml. portions of methanol. Evaporation of the methanol under reduced pressure gives sodium cis - 1 - carbethoxy - 1,2-epoxy-2-phenylethylphosphonate.

Example 101.—Preparation of sodium trans-1-carboxamido-1,2-epoxy-2-(2-furyl)ethylphosphonate (A) Trans-1-cyano-2-(2-furyl)vinylphosphonic acid.—A mixture of 2.0 g. of diethyl trans-1-cyano-2-(2-furyl) vinylphosphonate and 6.0 g. of trimethylchlorosilane is heated in a Carius tube at 150° C. for 5 hours. The contents are transferred to a round-bottomed flask with ether, and the volatile material is removed under reduced pressure. The residue is stirred with 70 ml. of water at room temperature for 30 minutes. The mixture is extracted with chloroform (2× 25 ml.) and ether (1× 25 ml.) and evaporated under reduced pressure to give trans-1-cyano-2-(2-furyl)vinylphosphonic acid.

(B) Sodium trans-1-carboxamido-1,2-epoxy-2-(2-furyl) ethylphosphonate.—To a mixture of 1.92 g. of trans-1-cyano-2-(2-furyl)vinylphosphonic acid, 0.84 g. of sodium bicarbonate and 0.161 g. of sodium tungstate dihydrate in 10 ml. of water is added 1.23 ml. of 30% aqueous hydrogen peroxide. The mixture is heated at 55° C. for 6 hours and then freeze-dried. The residue is triturated with three 15 ml. portions of methanol. Evaporation of the methanol under reduced pressure gives sodium trans-1-carboxamido-1,2-epoxy-2-(2-furyl)ethylphosphonate.

Example 102.—Preparation of sodium cis-1,2-diphenylepoxyethylphosphonate

To a mixture of 1.92 g. of cis-1,2-diphenylvinylphosphonic acid, 0.84 g. of sodium bicarbonate and 0.165 g. of sodium tungstate dihydrate in 10 ml. of water is added 1.23 ml. of 30% aqueous hydrogen peroxide. The mixture is heated at 55° C. for 6 hours and then freeze-dried. The residue is triturated with three 15 ml. portions of methanol. Evaporation of the methanol under reduced pressure gives sodium cis-1,2-diphenylepoxyethylphosphonate.

Example 103.—Preparation of sodium 2,2-diphenylepoxyethylphosphonate

To a mixture of 1.92 g. of 2,2-diphenylvinylphosphonic acid, 0.84 g. of sodium bicarbonate and 0.165 g. of sodium tungstate dihydrate in 10 ml. of water is added 1.23 ml. of 30% aqueous hydrogen peroxide. The mixture is heated at 55° C. for 6 hours and then freeze-dried. The residue is triturated with three 15 ml. portions of methanol. Evaporation of the methanol under reduced pressure gives sodium 2,2-diphenylepoxyethylphosphonate.

Example 104.—Preparation of sodium cis- and trans-1,2-epoxy-3-pentynyl-1-phosphonate (A) Diethyl cis-1-pentene-2-ynyl-1-phosphonate.—Diethyl 1,3-pentadiynyl phosphonate (20 g., 0.1 mole) in 200 ml. of ethanol is hydrogenated at 40 p.s.i. in the presence of 5 g. of 5% PdBaSO$_4$ catalyst at room temperature until 0.1 mole of hydrogen is taken up. The catalyst is filtered off and the solvent evaporated giving a mixture of diethyl cis-3-pentene-1-ynyl-1-phosphonate and diethyl cis-1-pentene-3-ynyl-1-phosphonate from which the latter is isolated by distillation through a 24 inch spinning band column at 0.1 mm. pressure in the presence of hydroquinone.

(B) Diethyl trans-1-pentene-3-ynyl-1-phosphonate.—A solution of diethyl cis-1-pentene-3-ynyl-1-phosphonate (20 g.) in 100 ml. of benzene is irradiated with ultraviolet light at room temperature for 18 hours. The benzene is removed by distillation and the residual oil fractionally distilled under reduced pressure to give diethyl trans-1-pentene-3-ynyl-1-phosphonate.

(C) Cis- and trans-1-pentene-3-ynyl-1-phosphonic acid.—Diethyl cis-1-pentene-3-ynyl-1-phosphonate (5 g.) is heated under reflux with 100 ml. of concentrated hydrochloric acid for 4 hours. The solution is evaporated under reduced pressure and the residue redissolved in water and reevaporated three times to remove hydrochloric acid leaving the desired phosphonic acid as a thick oil.

In a similar manner, diethyl trans-1-pentene-3-ynyl-1-phosphonate is hydrolyzed to trans-1-pentene-3-ynyl-1-phosphonic acid.

(D) Sodium cis- and trans-1,2-epoxy-3-pentynyl-1-phosphonate.—Cis-1-pentene-3-ynyl-1-phosphonic acid (2.9 g., 0.02 mole) is dissolved in 30 ml. of water and the pH adjusted to 5.5 with sodium hydroxide. Sodium tungstate dihydrate (0.66 g., 0.002 mole) and 30% hydrogen peroxide (1.7 ml., 0.02 mole) are added and the mixture is kept at 55° C. until the peroxide is consumed. The mixture is lyophilized to give the desired cis epoxy acid sodium salt.

In a similar manner, trans-1-pentene-3-ynyl-1-phosphonic acid is oxidized to sodium trans-1,2-epoxy-3-pentynyl-1-phosphonate.

Example 105.—Preparation of sodium 1,2-epoxy-3-propynyl-2-phosphonate (A) Diisopropyl 1-chloro-2-hydroxy-3-propynyl-2-phosphonate.—A mixture of 1-chloro-3-pentyne-2-one (55.7 g., 0.5 mole) and diisopropyl phosphite (83 g., 0.5 mole) is heated at 60° C. for 5 days. The mixture is dissolved in 500 ml. of ether, washed with aqueous sodium chloride solution and the ethereal solution dried over magnesium sulfate and evaporated to yield diisopropyl 1-chloro-2-hydroxy-3-propynyl-2-phosphonate.

(B) 1-chloro-2-hydroxy-3-propynyl-2-phosphonic acid.—Diisopropyl 1-chloro-2-hydroxy-3-propynyl-2-phosphonate (10 g.) is heated under reflux with 80 ml. of concentrated hydrochloric acid for one hour. The hydrochloric acid is evaporated and the residue redissolved in water and again evaporated to remove residual hydrochloric acid, leaving the desired phosphonic acid.

(C) Sodium 1,2-epoxy-3-propynyl-2-phosphonate.—A solution of 1-chloro-2-hydroxy-3-propynyl-2-phosphonic acid (5 g.) in 20 ml. of water is brought to pH 12 by the addition of sodium hydroxide. The pH is maintained at 12 by the gradual addition of N sodium hydroxide for a period of 30 minutes. The solution is then neutralized to pH 5 by the addition of dilute hydrochloric acid and the mixture is evaporated to dryness. The product is recovered by solution in methanol and removal of sodium chloride by filtration followed by evaporation of the methanolic solution. Sodium 1,2-epoxy-3-propynyl-2-phosphonate is obtained as a white solid.

Example 106.—Preparation of disodium cis-1,2-epoxypropyl-1,3-diphosphonate (A) Bis diisopropyl cis-propenyl-1,3-diphosphonate.—Triisopropyl phosphite (41.6 g., 0.2 mole) and diisopropyl cis-3-bromo-1-propenyl-1-phosphonate (57 g., 0.2 mole) are heated at 100° C. under a 12 inch Vigreux column for 1 hour. At the end of the period, isopropyl bromide begins to distill and heating is continued until no more distills. The residue is distilled under reduced pressure to give bis diisopropyl cis-propenyl-1,3-diphosphonate as a colorless oil.

(B) Cis propenyl 1,3-diphosphonic acid.—A mixture of 10 g. of bis diisopropyl cis propenyl-1,3-diphosphonate and 100 ml. of concentrated hydrochloric acid is heated under reflux for 3 hours. The acid is evaporated under reduced pressure. The residue is redissolved in 100 ml. of water which is evaporated. The dissolution in water and evaporation is repeated three times to remove remaining hydrochloric acid, leaving the cis propenyl 1,3-diphosphonic acid as a viscous oil.

(C) Disodium cis-1,2-epoxypropyl-1,3-diphosphonate.—Cis propenyl 1,3-diphosphonic acid (10 g., 0.05 mole) is dissolved in 30 ml. of water and the pH adjusted to 5.0 by the addition of sodium hydroxide. The temperature is raised to 55° C. and sodium tungstate (0.66 g., 0.002 mole) and 30% hydrogen peroxide (4.2 ml., 0.05 mole) are added. The temperature is maintained at 55–60° C. until the peroxide is consumed. The mixture is evaporated under reduced pressure and the epoxy diphosphonate recovered by crystallization from aqueous ethanol.

Example 107.—Preparation of disodium trans-1,2-epoxypropyl-1,3-diphosphonate

When the processes of Example 106 are carried out using diisopropyl trans-3-bromo-1-propenyl-1-phosphonate as the starting material, disodium trans-1,2-epoxypropyl-1,3-diphosphonate is obtained.

Example 108.—Preparation of disodium 2,3-epoxypropyl-1,2-diphosphonate

When the processes of Example 106 are carried out using diisopropyl 1-bromo-2-propenyl-2-phosphonate as the starting material, disodium 2,3-epoxypropyl-1,2-diphosphonate is obtained.

Example 109.—Preparation of sodium cis-1-phosphono-1,2-epoxypropyl-3-sulfonamide, sodium N,N-dimethyl cis - 1 - phosphono - 1,2 - epoxypropyl - 3-sulfonamide, disodium N - acetyl - cis - 1 - phosphono - 1,2 - epoxypropyl - 3 - sulfonamide and sodium N - methyl cis-1-phosphono - 1,2 - epoxypropyl - 3 - sulfonamide (A) Disodium cis - 3 - phosphono - 2 - propenyl - 1 - sulfonate.—Sodium - 3 - bromo - 1-propenylphosphonate (22.3 g., 0.01 mole) and sodium sulfite (12.6 g., 0.01 mole) are dissolved in 200 ml. of water and the mixture is left at room temperature for 18 hours. The water is removed under reduced pressure and the residue extracted with warm methanol to remove sodium bromide. The insoluble phosphono sulfonic acid disodium salt is recovered by filtration.

(B) Cis - 1 - phosphono - 1 - propenyl - 3 - sulfonylchloride.—Disodium cis - 3 - phosphono - 2 - propenyl - 1-sulfonate (12.3 g., 0.05 mole) and phosphorous pentachloride (31.2 g., 0.15 mole) are intimately mixed and heated at 60° C. for 2 hours. The phosphorous oxychloride is removed under reduced pressure and the residue stirred with 50 ml. of water to hydrolyze the phosphonyl dichloride group. The mixture is extracted twice with 100 ml. portions of chloroform, and the chloroform extracts dried over anhydrous sodium sulfate. After filtration, the solution of the sulfonyl chloride is used directly in the next step.

(C) N,N - dimethyl cis - 1 - phosphono - 1 - propenyl-3 - sulfonamide.—A solution of cis - 1 - phosphono - 1-propenyl - 3 - sulfonylchloride (5 g.) in 100 ml. of chloroform is added dropwise to a solution of 25% dimethylamine in 50 ml. of water with stirring during 20 minutes. The mixture is stirred at room temperature for 24 hours and the solvents and excess methylamine evaporated under reduced pressure. The residue is dissolved in 100 ml. of water and passed through a column of sulfonated polystyrene cation exchange resin (100 g.). The resin is eluted with water and the acidic eluate is evaporated to dryness under reduced pressure to give the desired sulfonamide.

In an analogous manner, the reaction of cis-1-phosphono-1-propenyl-3-sulfonylchloride affords cis-1-phosphono-1-propenyl-3-sulfonamide.

(D) N - acetyl cis - 1 - phosphono-1-propenyl-3-sulfonamide.—A mixture of cis-1-phosphono-1-propenyl-3-sulfonamide (10 g., 0.05 mole) and acetyl chloride (7.8 g., 0.1 mole) in 30 ml. pyridine is heated at 95–100° C. for 2 hours. The pyridine is removed under reduced pressure and the residue dissolved in 50 ml. of water and is poured into a column containing 100 ml. of sulfonated polystyrene cation exchange resin. The column is eluted with water and the acidic fraction combined and evaporated to dryness giving the desired N-acetyl sulfonamide.

In an analogous manner, the reaction of cis-1-phosphono-1-propenyl-3-sulfonamide with methylsulfonyl chloride affords N-methylsulfonyl cis-1-phosphono-1-propyl-3-sulfonamide.

(E) Sodium cis-1-phosphono-1,2-epoxpropyl-3-sulfonamide.—Cis-1-phosphono-1-propenyl-3 - sulfonamide (40 g., 0.02 mole) is dissolved in 20 cc. water with the addition of sodium hydroxide to bring the pH to 4.5. Sodium tungstate dihydrate (0.3 g., 0.001 mole) and 30% hydrogen peroxide (1.7 ml., 0.02 mole) are added and the temperature is raised to 55° C. The solution is maintained at 55–60° C. until a test with starch/iodide paper shows the absence of peroxide. The water is evaporated under reduced pressure and the sodium salt of cis-1-phosphono-1,2-epoxypropyl-3-sulfonamide recovered by crystallization from methanol.

In an analogous manner, the epoxidation of N,N-dimethyl cis-1-phosphono-1-propenyl-3-sulfonamide gives sodium N,N-dimethyl cis-1-phosphono-1,2-epoxypropyl-3-sulfonamide; N-acetyl cis-1-phosphono-1-propenyl-3-sulfonamide gives disodium N-acetyl cis-1-phosphono-1,2-epoxypropyl-3-sulfonamide and N-methyl cis-1-phosphono-1-propenyl-3-sulfonamide gives disodium N-methyl cis-1-phosphono-1,2-epoxypropyl-3-sulfonamide.

Example 110.—Preparation of sodium 2-phosphono-2,3-epoxypropyl-1-sulfonamide and its N-acetyl, N-methyl and N,N-dimethyl derivatives In an analogous series of reactions to those shown in Example 109, trans sodium-3-bromo-1-propenyl-1-phosphonate is converted into sodium trans 1-phosphono-1,2-epoxypropyl sulfonamide and its N-acetyl, N-methanesulfonyl and N,N-dimethyl derivatives; and sodium 1-bromo-2-propenyl-2-phosphonate is converted into sodium-2-phosphono-2,3-epoxypropyl-1-sulfonamide and its N-acetyl, N-methanesulfonyl and N,N-dimethyl derivatives.

Example 111.—Preparation of sodium cis- and trans-1,2-epoxy-3-butenyl-1-phosphonate and sodium 1,2-epoxy-3-butenyl-2-phosphonate (A) Dimethyl cis-1,3-butadienyl-1-phosphonate.—Dimethyl 3-butene-1-ynylphosphonate (10 g.) in 100 ml. of methanol is hydrogenated in the presence of 0.5 g. of 5% palladium on barium sulfate catalyst at room temperature and atmospheric pressure until one equivalent of hydrogen is taken up. The catalyst is removed and the methanol evaporated leaving dimethyl cis-1,3-butadienyl-1-phosphonate as an oil.

(B) Cis-1,3-butadienyl-1-phosphonic acid.—A mixture of dimethyl cis-1,3-butadienyl-1-phosphonate (8.1 g., 0.05 mole) an chlorotrimethyl silane (108 g., 1.0 mole) is refluxed for 18 hours and the excess chlorotrimethyl silane removed under reduced pressure. The residue is stirred with 100 ml. of water until homogeneous. Evaporation under reduced pressure affords the free phosphonic acid.

In an analogous manner, dimethyl 1,3-butadienyl-2-phosphonate is hydrolyzed to 1,3-butadienyl-2-phosphonic acid.

(C) Sodium cis-1,2-epoxy-3-butenyl-1-phosphonate.—Cis-1,3-butadienyl-1-phosphonic acid (6.7 g., 0.05 mole) is dissolved in 50 ml. of water and the pH is adjusted to 4.2 with sodium hydroxide solution. Sodium tungstate dihydrate (0.66 g., 0.004 mole) is added, followed by 30% hydrogen peroxide (4.2 ml., 0.05 mole). The mixture is heated to 60° C. and maintained at that temperature for 4 hours, when a negative starch-iodide test for peroxide is obtained. The mixture is evaporated to dryness under reduced pressure leaving the desired epoxide salt as a white solid.

In an analogous manner, 1,3-butadienyl-2-phosphonic acid is epoxidized to sodium 1,2-epoxy-3-butenyl-2-phosphonate.

(D) Sodium trans - 1,2-epoxy - 3 - butenyl-1-phosphonate.—Trans-1,3-butadienyl-1-phosphonyldichloride (8.5 g., 0.05 mole) is stirred in 100 ml. of water until homogeneous. The solution is evaporated under reduced pressure to remove hydrochloric acid and the phosphonic acid is epoxidized in a manner analogous to the previous example to give sodium trans-1,2-epoxy-3-butenyl-1-phosphonate.

In the foregoing examples processes have been described resulting in the preparation of the sodium salt. As will be readily apparent to those skilled in this art, other salts such as other metal salts, amine or the ammonium salts are obtained by substituting the appropriate base in the described processes. Alternatively, the sodium salts obtained as described in the examples can be converted to the free phosphonic acid by known methods, for example by passing an aqueous solution of the sodium salt through a column containing a sulfonic acid cation exchange resin of the polystyrene type, such as Dowex 50, on the hydrogen cycle and collecting the effluent comprising an aqueous solution of the free phosphonic acid. Thus, upon reacting the phosphonic acid with alkali metal or alkaline earth metal hydroxides, carbonates or bicarbonates of the corresponding alkali metal or alkaline earth metal salt of the phosphonic acid is obtained. Alternatively, reaction with other metal ions such as silver, iron and the like produces the corresponding metal salts. Reaction of the phosphonic acid with ammonium hydroxide results in the obtainment of the ammonium salts. Similarly, salts of organic bases, such as primary, secondary and tertiary amines, for example, monoalkylamines, dialkylamines, trialkylamines, alkyldiamines, and nitrogen-containing heterocyclic amines are prepared in accordance with methods known in this art. The salts can be mono salts such as the monosodium salt obtained, for example, by reacting one equivalent of sodium hydroxide with one equivalent of acid; disalts obtained, for example, by reacting two equivalents of sodium hydroxide with one equivalent of the acid; mixed disalts obtained by reacting one equivalent of the monosalt with one equivalent of a second base; diphosphonate salts obtained, for example, by reacting one equivalent of calcium hydroxide with two equivalents of the acid; mixed salts such as calcium hydrogen lactate obtained by reacting one equivalent of the lactic acid with the calcium diphosphonate salt and the like.

Representative examples of salts of organic bases that might be mentioned are salts with amines such as α-phenethylamine, diethylamine, quinine, brucine, lysine, protamine, arginine, procaine, ethanolamine, morphine, benzylamine, ethylenediamine, N,N' - dibenzylethylenediamine, diethanolamine, piperazine, dimethylaminoethanol, 2 - amino - 2 - methyl-1-propanol, theophylline, esters of amino acids, N-methylglucamine and the like. If desired, the basic moiety of the salt can be biologically active amines such as neomycin, streptomycin, erythromycin, oleandomycin, novobiocin and the like.

The salts of optically-acive bases are especially valuable since they can be utilized to separate the enantiomeric mixtures of isomers produced by the described reactions. Thus, the enantiomers comprising nonsuperimposable, mirror-image, dextrorotatory and levorotatory isomers can be separated or resolved by forming a diastereomeric salt with an optically-active salt forming compound such as a base. For example, when a mixture of optically active forms of the phosphonic acid is combined with a base having an optically-active center, two diastereomers are formed whose properties are different and can therefore be separated by methods known in the art, such as fractional crystallization. Examples of suitable optically-active bases that might be mentioned are quinine, brucine, (+) α-phenethylamine, (−) α-phenethylamine, (+) amphetamine, and other bases known in this art. Alternatively, the enantiomeric mixtures can be separated by other methods known in the art such as separation of stereoisomeric esters, amides and the like, or biological processes which result in selective cleavage of esters or amides or consumption of one of the enantiomeric isomers.

These resolution or separation procedures are useful since it is thereby possible to obtain the active enantiomer which is more active than the enantiomeric mixture, and hence, more effective bacteriocidally in lower concentrations.

The phosphonic acids prepared as described in the foregoing examples, as well as the active enantiomers thereof and various derivatives thereof, are useful antimicrobial agents which are active in inhibiting the growth of gram - positive and gram - negative microorganisms. These antibiotics and particularly the salts are active against Bacillus, Salmonella, and Proteus pathogens such as *Bacillus subtilis, Salmonella schottmuelleri, Proteus vulgaris* and the like. Thus, the described phosphonic acids and salts thereof can be used as antiseptic agents to remove susceptible organisms from pharmaceutical, dental and medical equipment and other areas subject to infection by such organisms in concentrations from about 1–10%. Similarly, they can be used to separate certain microorganisms from mixtures of microorganisms. Since the phosphonic acids, and particularly the salts thereof, are very active in inhibiting the growth of various species of Salmonella, they can be used as disinfectants in washing eggs and areas subject to infection by Salmonella in aqueous concentrations of from ½ to about 5%. These phosphonic acids and their salts are also useful as bactericides, either alone or in combination with other antibacterial agents, in various industrial applications, for example, in inhibiting undesirable bacterial growth in the white water in paper mills and in paints such as polyvinyl acetate latex paint where they are useful in concentrations of 1–100 p.p.m.

The phosphonic acid and salts thereof are also useful in the treatment of bacterial infections in man and animals where they can be used, for example, topically in suitable salves and ointments containing 1–10% of the phosphonic acid for the treatment of topical infections. They can also be used systemically, either alone or in combination with other antibiotics, in the treatment of infectious diseases in man and animals. For this purpose, they can be administered orally in suitable dosage unit forms such as capsules or tablets or in a liquid solution or suspension. Alternatively, the antibiotic can also be administered parenterally by injection. These formulations can be prepared using suitable diluents, extenders, granulating agents, preservatives, binders, flavoring agents and coating agents known to those skilled in this art.

The antibiotic activities of the various phosphonic acids of the present invention are conveniently assayed by a disc-plate procedure using *Proteus vulgaris* NRRL B–3361 as the test organism. The test culture is maintained as a slant culture on a nutrient agar (Difco) plus 0.2% yeast extract (Difco). The inoculated slants are incubated at 37° C. for 18–14 hours and stored at refrigerator temperatures for one week, fresh slants being prepared each week.

The inoculum for the assay plates is prepared each day by inoculating a 250 ml. Erlenmeyer flask containing 50 ml. of nutrient broth (Difco) plus 0.2% yeast extract (Difco) with a scraping from the slant. The flask is incubated at 37° C. on a shaking machine for 18–24 hours. The broth culture is then adjusted to 40% transmittance at a wavelength of 660 mμ, using a Bausch & Lomb Spectronic 20 by the addition of 0.2% yeast extract solution to the growth. Uninoculated broth is used as a blank for this determination. 30 ml. of the adjusted broth is used to inoculate 1 liter of medium.

Nutrient agar (Difco) plus 0.2% yeast extract (Difco) is used as the assay medium. This medium is prepared, sterilized by autoclaving, and allowed to cool to 50° C. After the medium is inoculated, 10 ml. is added to sterile petri dishes and the medium is allowed to solidify.

The activity is expressed in terms of units, a unit being defined as the concentration of the antibiotic per ml. which on a ½ inch paper disc will produce a zone diameter of 28 mms. Four concentrations of the phosphonic acid are employed for the preparation of the standard curve, namely, 0.3, 0.4, 0.6 and 0.8 unit per ml.; each concentration being obtained by the dilution in tris (hydroxymethyl) aminomethane buffer adjusted to pH 8.0. Four discs are placed on each of the five plates for the preparation of the standard curve, each plate containing one disc of each of the four concentrations of antibiotic. The plates are incubated for 18 hours at 37° C. and the diameters of the zones of inhibition in mms. are measured. An average zone diameter for each concentration is calculated, from which a standard curve is prepared on semi-log graph paper. The slope of the line obtained is between 4 and 5.

Samples of the phosphonic acid to be assayed are diluted in 0.05 M buffer at pH 8.0 to an appropriate concentration. Discs are dipped into the test solution and placed on the surface of the assay plate; two discs for each sample are normally placed on one plate opposite to one another. The plates are incubated at 37° C. for 18 hours and the zone diameters in mms. are determined. The potency of the sample is determined by means of a nomograph or from the standard curve.

As has been described above, the processes of the present invention can be used to produce esters and amides of the various phosphonic and phosphonothioic acids by starting with an appropriately substituted intermediate product and introducing the epoxy group. The esters and amidates so obtained in some cases can be used directly as bactericides or, alternatively, can be cleaved in accordance with methods known in the art to produce the phosphonic or phosphonothioic acid compound. Also, the esters and amidates can be prepared from the phosphonic and phosphonothioic acid compounds in accordance with the procedures well known in this art. The phosphonic and phosphonothioic acids and their salts and biologically labile esters, amides, guanidides, hydrazides, imides, azides, cyanates, pyrophosphonates, anhydrides and diureides have significant antibacterial activity against pathogens.

Various changes and modifications in the procedures herein disclosed will occur to those skilled in the art, and to the extent that such changes and modifications are embraced by the appended claims, they constitute part of this invention.

We claim:

1. A phosphonic acid compound of the formula:

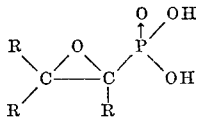

and the alkali, alkaline earth metal salts, and loweralkyl esters thereof wherein R represents hydrogen or carboxy provided that only one of the R substituents is carboxy.

2. A compound of claim 1 which is cis-2-carboxyepoxyethyl-1-phosphonic acid and its alkali and alkaline earth metal salts.

3. A compound of claim 1 which is trans-2-carboxyepoxyethyl-1-phosphonic acid and its alkali and alkaline earth metal salts.

4. A compound of claim 1 which is 1-carboxyepoxyethyl-1-phosphonic acid and its alkali and alkaline earth metal salts.

References Cited

UNITED STATES PATENTS

| | | | |
|---|---|---|---|
| 2,627,521 | 2/1953 | Coover | 260—348 |
| 2,770,610 | 11/1956 | Hardy et al. | 260—348 X |
| 3,281,502 | 10/1966 | Pelletier et al. | 260—348 X |
| 3,496,080 | 2/1970 | Harris | 204—158 |
| 3,579,570 | 5/1971 | Nicholson et al. | 260—348 R |

FOREIGN PATENTS

| | | |
|---|---|---|
| 1,087,066 | 10/1967 | Great Britain. |
| 1,046,047 | 11/1958 | Germany. |

OTHER REFERENCES

Churi et al.: Jour. Am. Chem. Soc., vol. 83, pp. 1824–5 (1966).

NORMA S. MILESTONE, Primary Examiner

U.S. Cl. X.R.

260—556 A, 944, 545 P, 933, 926, 347.3, 551 P, 941, 953, 940, 502.4 R, 950, 955, 956, 952, 946, 948, 348 R, 290 HL, 290 V, 297 P, 332.5, 329 P, 332.3 H, 632 Y, 596, 309.5 456 R, 503, 543 R, 543 P, 939, 932, 112, 326 R, 302 E, 302 H, 250 R, 268, 936, 294.7 D, 247.7 D, 284; 424—203